(12) United States Patent
Yamaguchi et al.

(10) Patent No.: US 7,848,055 B2
(45) Date of Patent: Dec. 7, 2010

(54) MAGNETIC HEAD WITH AN ELECTRODE FILM INCLUDING DIFFERENT FILM THICKNESSES

(75) Inventors: Atsushi Yamaguchi, Tokyo (JP); Kiyoshi Noguchi, Tokyo (JP); Shingo Miyata, Tokyo (JP); Masashi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 645 days.

(21) Appl. No.: 11/763,057

(22) Filed: Jun. 14, 2007

(65) Prior Publication Data

US 2008/0316642 A1 Dec. 25, 2008

(51) Int. Cl.
*G11B 5/127* (2006.01)

(52) U.S. Cl. .............. 360/125.11; 360/125.09; 360/125.1

(58) Field of Classification Search .............. 360/125.1, 360/125.09, 125.08, 125.11
See application file for complete search history.

(56) References Cited

U.S. PATENT DOCUMENTS

| 7,433,152 | B2* | 10/2008 | Watabe et al. ......... 360/125.08 |
| 7,516,538 | B2* | 4/2009 | Sasaki et al. ............. 29/603.18 |
| 2002/0071207 | A1* | 6/2002 | Kanada et al. .............. 360/120 |
| 2002/0163759 | A1* | 11/2002 | Kanada et al. .............. 360/126 |
| 2005/0029108 | A1* | 2/2005 | Kawasaki et al. ........... 205/104 |
| 2007/0195457 | A1 | 8/2007 | Matono et al. ......... 360/123.24 |
| 2007/0211391 | A1 | 9/2007 | Hirata et al. |
| 2008/0297951 | A1* | 12/2008 | Yamashita et al. .......... 360/314 |

FOREIGN PATENT DOCUMENTS

| JP | 4-195809 | 7/1992 |
| JP | 11-100693 | 4/1999 |
| JP | 2000-207708 | 7/2000 |
| JP | 2002-157704 | 5/2002 |
| JP | 2006-253252 | 9/2006 |
| JP | 2006-269690 | 10/2006 |
| JP | 2007-242786 | 9/2007 |
| JP | 2007-257815 | 10/2007 |

OTHER PUBLICATIONS

U.S. Appl. No. 11/691,907, filed Mar. 27, 2007, Miyata et al.
U.S. Appl. No. 11/733,469, filed Apr. 10, 2007, Yamaguchi et al.

* cited by examiner

*Primary Examiner*—Julie Anne Watko
(74) *Attorney, Agent, or Firm*—Oblon, Spivak, McClelland, Maier & Neustadt, L.L.P.

(57) ABSTRACT

The present invention relates to a perpendicular recording magnetic head. A main magnetic pole film of a perpendicular recording element is a plated film formed on an electrode film and having a small width portion and a large width portion. The small width portion is a portion for emitting a perpendicular magnetic field from a front end thereof, while the large width portion is portion being continuous with a rear end of the small width portion and having an increased width. The electrode film is different in film thickness between beneath a portion of the plated film forming at least the front end of the small width portion and beneath a portion of the plated film forming the large width portion.

24 Claims, 28 Drawing Sheets

MAGNETIC HEAD WITH AN ELECTRODE FILM INCLUDING DIFFERENT FILM THICKNESSES

TECHNICAL FIELD

The present invention relates to a magnetic head, a head assembly, and a magnetic recording/reproducing apparatus.

BACKGROUND OF THE INVENTION

In the field of magnetic heads to be mounted on a magnetic recording apparatus such as a hard disk drive (HDD), recently, the recording method is being shifted from longitudinal recording to perpendicular recording in order to improve the recording density with respect to a magnetic recording medium such as a hard disk. The perpendicular recording method achieves high linear recording density and also has an advantage that the recording medium after recording becomes highly resistant to heat fluctuation.

A perpendicular recording magnetic head is provided with a coil film for generating a magnetic flux and a main magnetic pole film for guiding the magnetic flux to a recording medium. The main magnetic pole film has such a pattern that its magnetic pole tip for supplying a perpendicular magnetic field to a magnetic recording medium is a tapered small width portion and a large width portion (or yoke portion), which functions as a magnetic flux supplying portion to the small width portion, is disposed in continuous relation with the rear end of the small width portion. The main magnetic pole film is generally formed on an electrode film, which functions as a seed film, by electroplating.

In order to improve the recording capacity of a hard disk drive (HDD), meanwhile, the recording resolution must be improved by increasing the coercive force of the magnetic recording medium while increasing the track density by reducing the width of the magnetic pole tip formed by the small width portion of the main magnetic pole film in the magnetic head.

In order to ensure sufficient overwrite characteristic (OW) for the magnetic recording medium of such a high coercive force, the main magnetic pole film of the magnetic head must have a high saturation magnetic flux density. Heretofore, accordingly, a high saturation magnetic flux density material, for example, a high saturation magnetic flux density magnetic material such as a FeCo-type material, a CoNiFe ternary alloy film, FeC or FeN, has been used for the plated film of the main magnetic pole film, and the electrode film, which functions as a seed film therefor, has also been made of a high saturation magnetic flux density magnetic material. For example, Japanese Unexamined Patent Application Publication No. 2006-253252 discloses a main magnetic pole in which a FeCoNi plated film is formed on a FeCoNi electrode film.

On the other hand, Japanese Unexamined Patent Application Publication No. 2006-269690 discloses a main magnetic pole film in which a FeCo alloy plated film is formed on a non-magnetic conductive layer and then used as an electrode film for formation of a FeNi alloy plated film thereon.

Another important factor which has to be kept in mind with respect to perpendicular recording magnetic heads is the problem of pole erase that a signal recorded on the magnetic recording medium becomes erased by the main magnetic pole film when recording is not performed.

In the perpendicular recording magnetic heads, the main magnetic pole film for recording has its hard axis directed along an air bearing surface direction to perform recording in a magnetization rotation mode. That is, residual magnetization along the air bearing surface direction is minimized to prevent an excess magnetic flux from being generated when recording is not performed, thereby avoiding the pole erase. In order to assure this function, the coercive force Hch of the main magnetic pole film along the hard axis has to be kept low. In the present situation where the width at the tip of the main magnetic pole film (or track direction width) has been decreasing greatly according to the demand for high density recording, moreover, the magnetic domain cannot be arranged orderly at the tip, and therefore it is also important to keep low the coercive force Hce along the easy axis.

As described above, the main magnetic pole film of the perpendicular magnetic recording element has such a pattern that the small width portion for supplying a perpendicular magnetic field to a magnetic recording medium is continuous with the large width portion for supplying a magnetic flux to the small width portion. Since the small width portion and the large width portion have different roles, as set forth above, it is desirable to give them appropriate different magnetic properties.

However, as disclosed in Japanese Unexamined Patent Application Publication Nos. 2006-253252 & 2006-269690, since it has been conventional to grow the plated film on a common electrode film at one stroke as a main magnetic pole film, not only the overwrite characteristic at the small width portion and the large width portion but also the coercive force has been primarily determined by magnetic properties of the electrode film and the plated film, and therefore it has been impossible to reconcile them.

In addition, since high saturation magnetic flux density magnetic materials are generally of a high coercive force, too, the improvement in overwrite characteristic by increasing the saturation magnetic flux density cannot be reconciled with the improvement in pole erase by decreasing the coercive force, sacrificing one to improve the other.

SUMMARY OF THE INVENTION

It is an object of the present invention to provide a perpendicular recording magnetic head in which improvement in overwrite characteristic by increasing saturation magnetic flux density can be reconciled with improvement in pole erase by decreasing coercive force.

It is another object of the present invention to provide a head assembly and a magnetic recording/reproducing apparatus using the above perpendicular recording magnetic head.

It is still another object of the present invention to provide a method suitable for manufacturing the above magnetic head.

To achieve the above objects, in a magnetic head according to the present invention, an electrode film is different in film thickness between a portion used as a seed film for plating a main magnetic pole film, which functions as a perpendicular magnetic field emitting portion, and a portion used as a seed film for plating a large width portion, which supplies a magnetic flux to a small width portion.

The fact that the electrode film is different in film thickness between beneath the small width portion and beneath the large width portion means that plating is performed at different current densities for the small width portion and the large width portion. The fact that plating is performed at different current densities means that the plated film formed thereon varies in composition ratio, though made of the same materials. Thus, the improvement in overwrite characteristic by increasing the saturation magnetic flux density can be reconciled with the improvement in pole erase by decreasing the coercive force.

More specifically, the main magnetic pole film of the perpendicular recording element is typically formed by a plated film containing Fe. In a case of a plated film containing Fe, e.g., a FeCoNi plated film, the Fe content in the formed plated film decreases with an increase in the electrical resistance of the electrode film, which functions as a seed film. The electrical resistance of the electrode film increases with decreasing its film thickness. Thus, the relative proportion of the Fe component in the plated film formed on the electrode film varies depending on the film thickness of the electrode film, and the saturation magnetic flux density and the coercive force of the plated film are determined accordingly, which enables to reconcile the improvement in overwrite characteristic by increasing the saturation magnetic flux density with the improvement in pole erase by decreasing the coercive force.

Magnetic heads of this type are generally of the complex type including the above perpendicular recording element and a reproducing element. As the reproducing element, there may be employed a giant magneto-resistive effect element (GMR) or a ferromagnetic tunnel junction element (TMR).

The present invention also discloses a head assembly and a magnetic recording/reproducing apparatus. The head assembly includes the above magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

The magnetic recording/reproducing apparatus according to the present invention includes the above head assembly and a magnetic recording medium. A typical example of the magnetic recording/reproducing apparatus is a hard disk drive (HDD) using a magnetic recording medium called "hard disk".

The other objects, constructions and advantages of the present invention will be further detailed below with reference to the attached drawings. However, the attached drawings show only illustrative examples.

DESCRIPTION OF THE PREFERRED EMBODIMENTS

1. Magnetic Head

Figure 1:
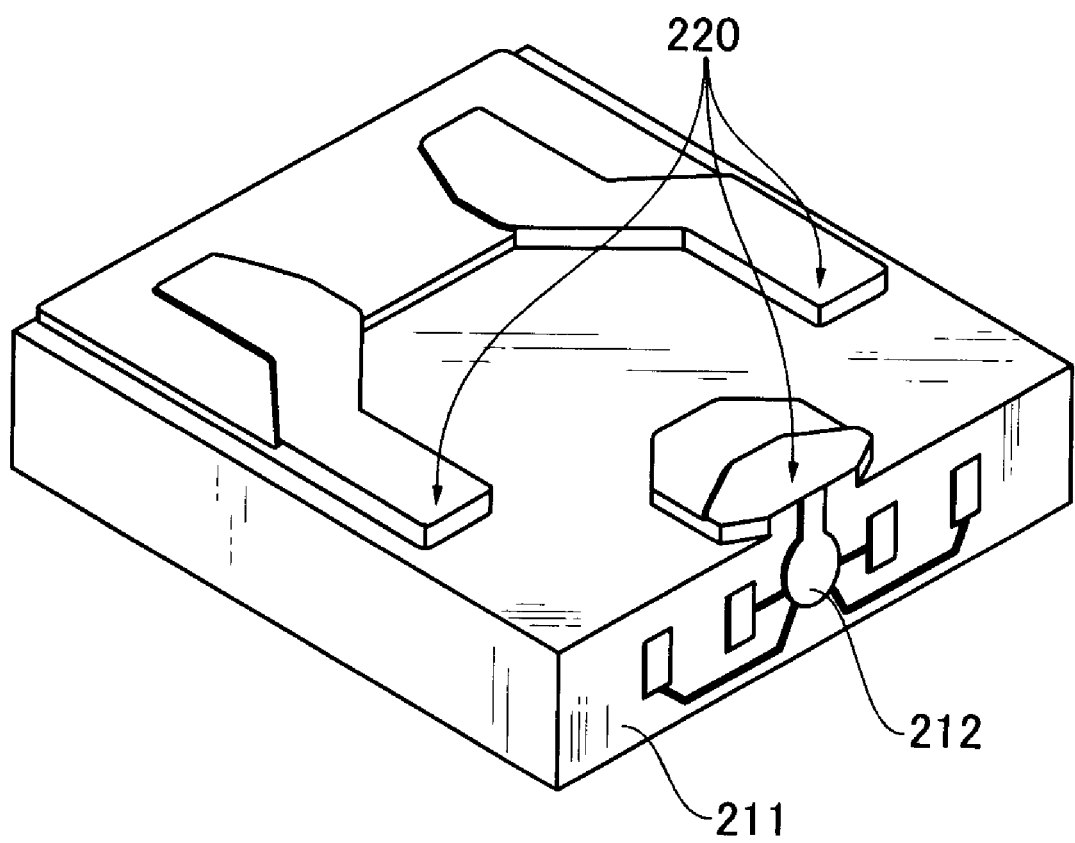
FIG. 1 is a perspective view of a magnetic head according to the present invention.
Figure 2:
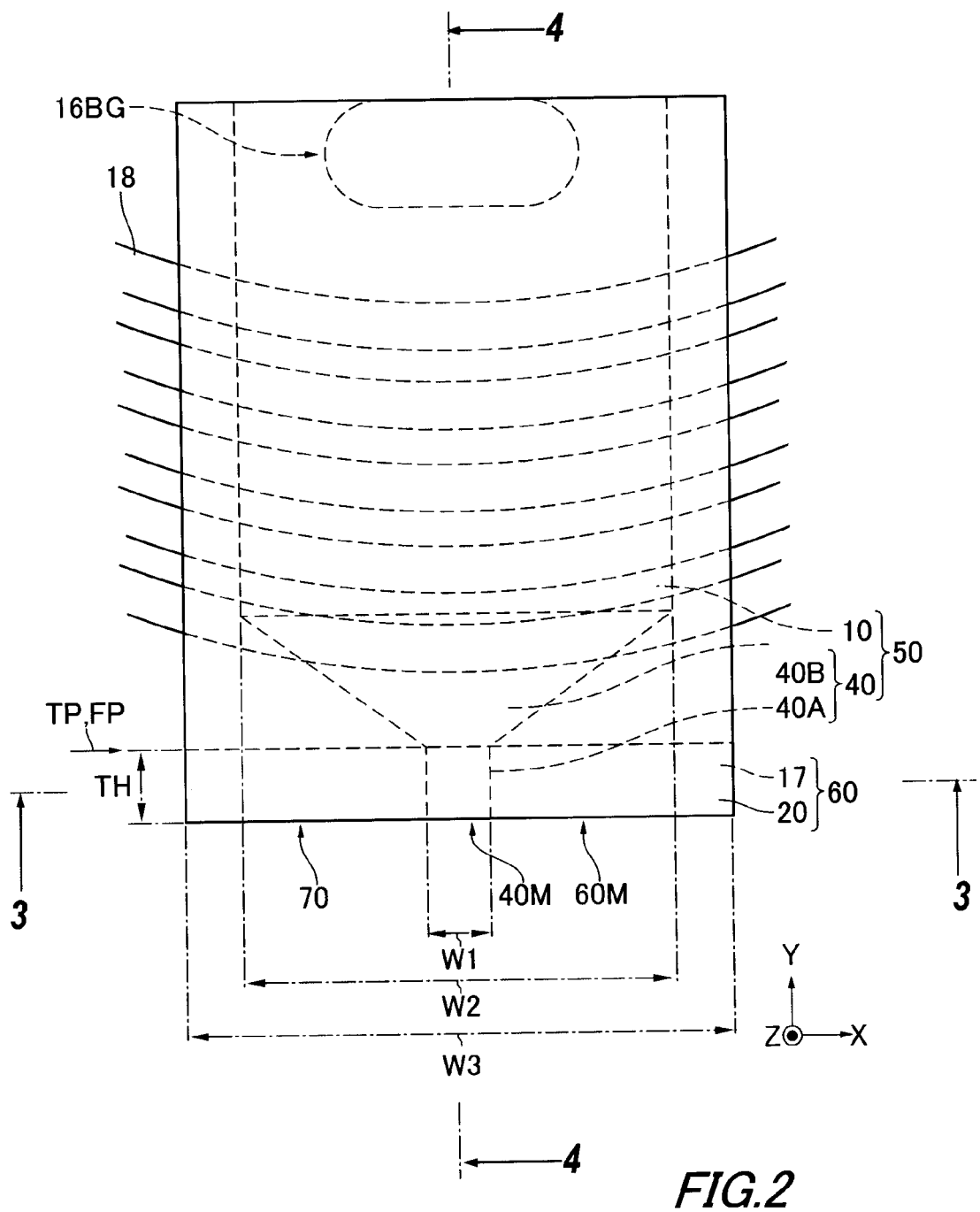
FIG. 2 is a plan view schematically showing a part of a perpendicular recording element contained in a magnetic head according to the present invention.
Figure 3:
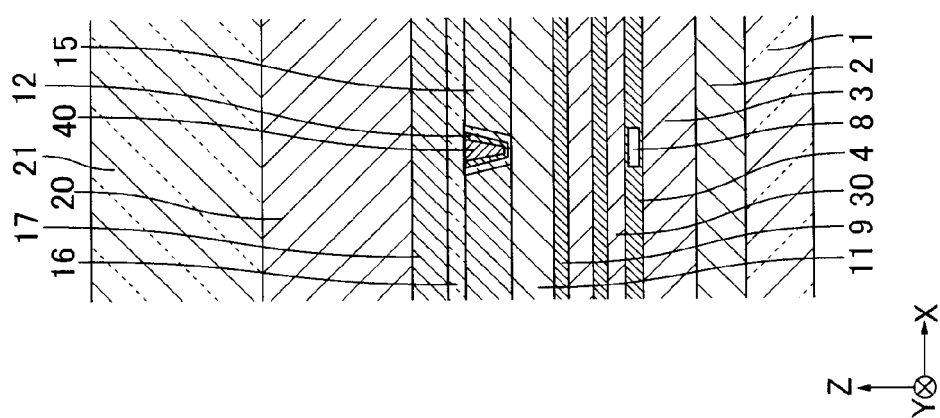
FIG. 3 is a sectional view taken along line 3-3 in FIG. 2.

FIGS. 1 to 3 show a magnetic head to be used in combination with a rapidly spinning magnetic recording medium such as a hard disk. Magnetic heads of this type are generally called "floating-type". However, the magnetic head according to the present invention is not necessarily required to be of the floating-type. For example, it may be a magnetic head which comes into contact with a magnetic recording medium.

In the magnetic head, referring first to FIG. 1, a thin-film element 212 for performing both recording and reproducing processes is attached to one face of a substrate 211 made of, for example, a non-magnetic insulating material such as AlTiC to have a generally rectangular prism structure. The substrate 211 has an air bearing surface 220 directly related to the floating characteristics, and the thin-film element 212 is attached to another face perpendicular to the air bearing surface 220.

Figure 4:
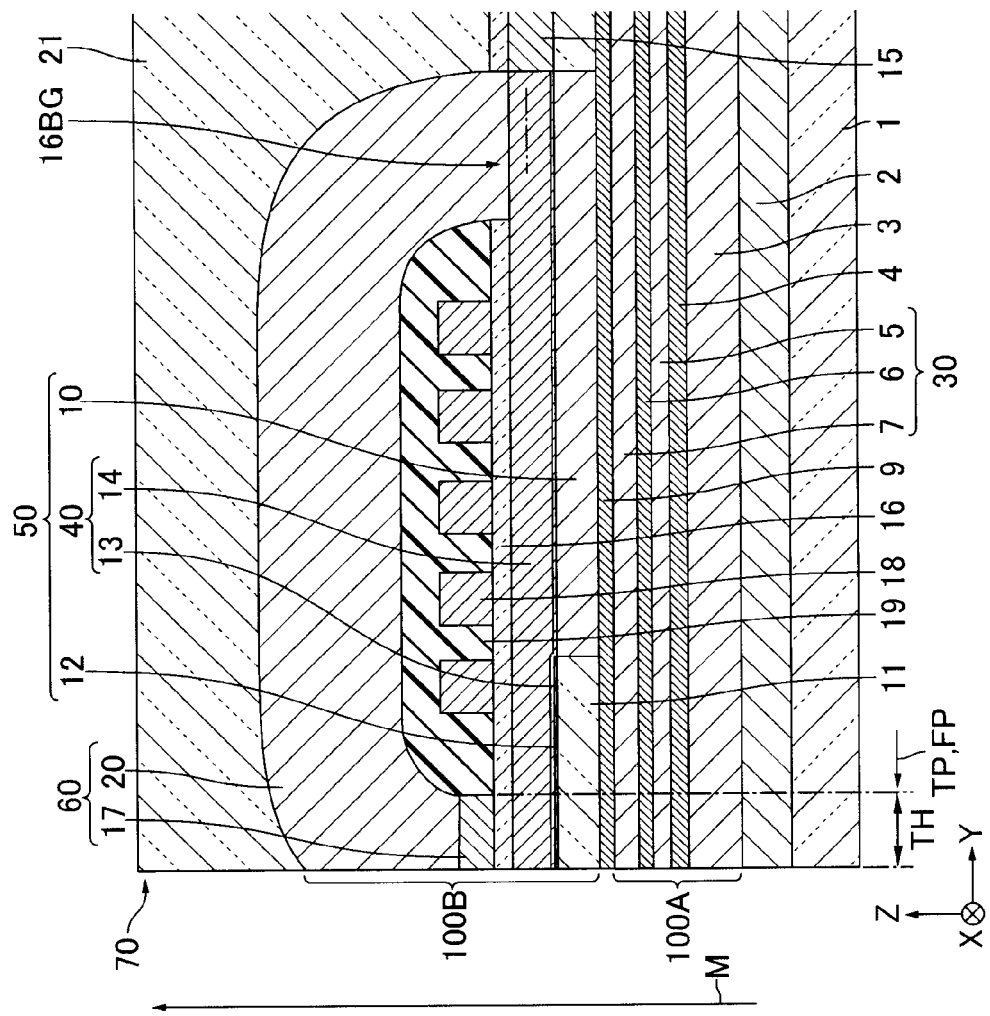
FIG. 4 is a sectional view taken along line 4-4 in FIG. 2.

Details of the thin-film element 212 are shown in FIGS. 2 to 4. In FIGS. 2 to 4, dimensions along X, Y and Z axes are called "width", "length" and "thickness/height", respectively. Along the Y axis, moreover, one side close to an air bearing surface 70 and the other side remote therefrom are designated by "front" and "rear", respectively, and being positioned forward and being positioned rearward may be expressed by "project" and "recede", respectively.

The magnetic head shown in FIGS. 2 to 4 is a complex-type head which can perform both recording and reproducing. In the magnetic head, an insulating film 2, a reproducing head portion 100A using magneto-resistive effect (MR effect), a separating film 9, a recording head portion 100B for performing a recording process in a perpendicular recording method, and an overcoat film 21 are layered on a substrate 1 in the mentioned order.

The substrate 1 is made of, for example, a ceramic material such as AlTiC ($Al_2O_3$*TiC), while the insulating film 2, the separating film 9 and the overcoat film 21 are made of, for example, a non-magnetic insulating material such as aluminium oxide ($Al_2O_3$: hereinafter merely referred to as "alumina").

The reproducing head portion 100A is formed, for example, by layering a lower read shield film 3, a shield gap film 4, and an upper read shield film 30 in the mentioned order. In the shield gap film 4, a reproducing element (or MR element 8) is embedded in such a manner as to be exposed on the air bearing surface 70. The air bearing surface 70 is uniquely defined with reference to one end face of the substrate 1 supporting a series of components from the insulating film 2 to the overcoat film 21, more specifically, refers to a surface containing one end face of the substrate 1.

Both the lower read shield film 3 and the upper read shield film 30 function to magnetically separate the MR element 8 from the surroundings and extend rearward from the air bearing surface 70. The lower read shield film 3 is made of, for example, a magnetic material such as a nickel-iron alloy (NiFe). In this case, the nickel-iron alloy (NiFe) may have a composition ratio of 80 wt. % of Ni and 20 wt. % of Fe.

The upper read shield film 30 is formed, for example, by layering two upper read shield film portions 5, 7 with a non-magnetic film 6 interposed therebetween. Both the upper read shield film portions 5, 7 are made of, for example, a magnetic material such as NiFe. The non-magnetic film 6 is made of, for example, a non-magnetic material such as ruthenium (Ru) or alumina. The upper read shield film 30 is not necessarily required to have a layered structure but may have a single film structure of a magnetic material.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording head portion 100B is a so-called shield-type perpendicular recording element including a non-magnetic film 11, a first non-magnetic film 15, a magnetic pole film 50, a gap film 16 with an opening (or back gap 16BG) for magnetic connection, a coil film 18 embedded in an insulating film 19, and a magnetic film 60.

The magnetic pole film 50 extends rearward from the air bearing surface 70. The magnetic pole film 50 includes an auxiliary magnetic pole film 10, a second non-magnetic film 12, and a main magnetic pole film 40.

The auxiliary magnetic pole film 10 extends from behind the air bearing surface 70 to the back gap 16BG. For example, the auxiliary magnetic pole film 10 is disposed on the leading side with respect to the main magnetic pole film 40 and has a rectangular plan shape (width W2), as shown in FIG. 2. The non-magnetic film 11 functions to electrically and magnetically separate the auxiliary magnetic pole film 10 from the surroundings and is made of, for example, a non-magnetic insulating material such as alumina.

For example, the second non-magnetic film 12 extends from the air bearing surface 70 to the forefront position of the auxiliary magnetic pole film 10 for connecting the auxiliary magnetic pole film 10 and the main magnetic pole film 40 and is made of a non-magnetic insulating material such as alumina or aluminium nitride. However, the extent of the second non-magnetic film 12 may be set arbitrarily.

The sectional shape of the second non-magnetic film 12 parallel to the air bearing surface 70 is U-shaped, as shown in FIG. 3, and the main magnetic pole film 40 is embedded inside the second non-magnetic film 12. The second non-magnetic film 12 is formed, for example, by ALD to have a uniform thickness around the main magnetic pole film 40 (along its bottom face and both side faces).

The first non-magnetic film 15 functions to electrically and magnetically separate the main magnetic pole film 40 from the surroundings. The first non-magnetic film 15 is embedded outside the second non-magnetic film 12 and is made of, for example, a non-magnetic insulating material such as alumina.

The first and second non-magnetic films 15, 12 are each made of a non-magnetic insulating material but have different compositions because of their different formation methods. More specifically, the first non-magnetic film 15 is formed such as by sputtering using an inert gas and contains the inert gas because of its formation method. It should be noted that examples of the inert gas include argon (Ar), krypton (Kr) and xenon (Xe). On the other hand, the second non-magnetic film 12 is formed such as by ALD not using any inert gas and contains no inert gas because of its formation method. Whether the first and second non-magnetic films 15, 12 contain any inert gas or not can be determined by using a composition analysis method such as scanning transmission electron microscopy (STEM)-energy-dispersive X-ray spectroscopy (EDS).

The first and second non-magnetic films 15, 12 are also different in the content of specific components because of their different formation methods. More specifically, since water and trimethyl aluminium (TMA) are used in ALD but not used in sputtering, the content of hydrogen (H) is larger in the second non-magnetic film 12 than in the first non-magnetic film 15.

Figure 14:
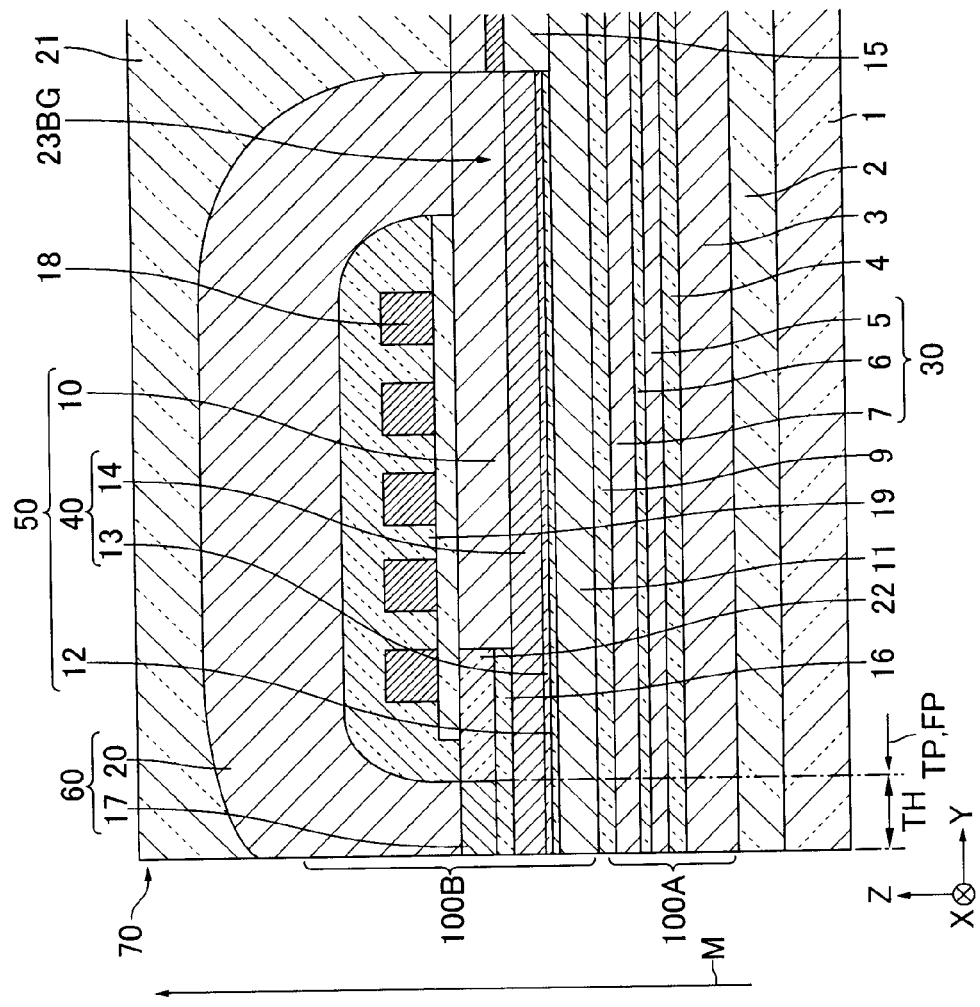
FIG. 14 is a sectional side view of the magnetic head shown in FIG. 13.
Figure 15:
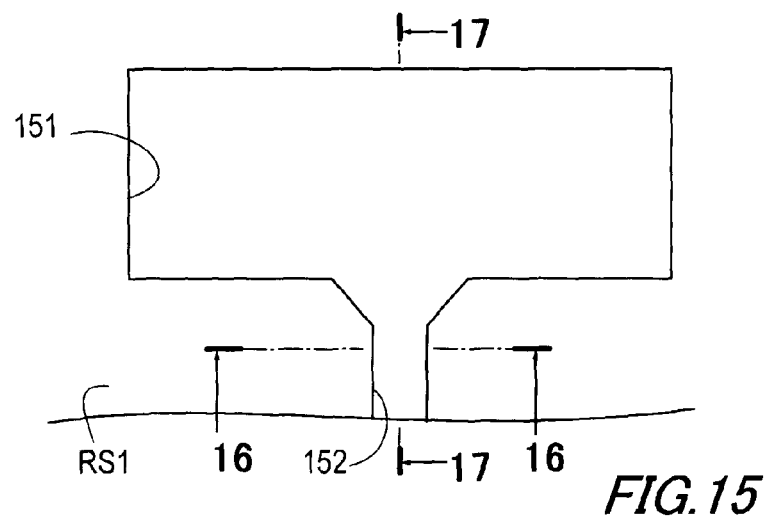
FIG. 15 is a view showing a step in a method for manufacturing a magnetic head according to the present invention.
Figure 16:
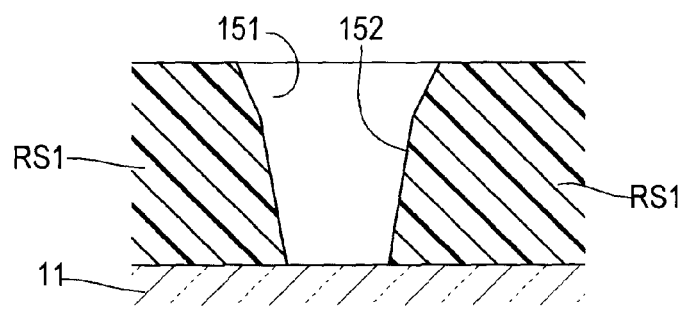
FIG. 16 is a sectional view taken along line 16-16 in FIG. 15.

The main magnetic pole film 40 extends from the air bearing surface 70 to the back gap 16BG. The main magnetic pole film 40 includes, for example, a small width portion 40A extending rearward from the air bearing surface 70 and a large width portion 40B connected to the rear end of the small width portion 40A, as shown in FIGS. 14 to 16. The small width portion 40A is a substantial magnetic flux emitting portion (so-called magnetic pole film) and has a constant width W1 which defines the recording track width. The large width portion 40B is a portion intended to supply a magnetic flux to the small width portion 40A and has a width W2 larger than the width W1. The width W2 of the large width portion 40B is almost constant. The large width portion 40B is gradually narrowed in its front portion toward the small width portion 40A. The position where the width of the main magnetic pole film 40 starts to increase from W1 to W2 is a so-called flare point FP.

Figure 5:
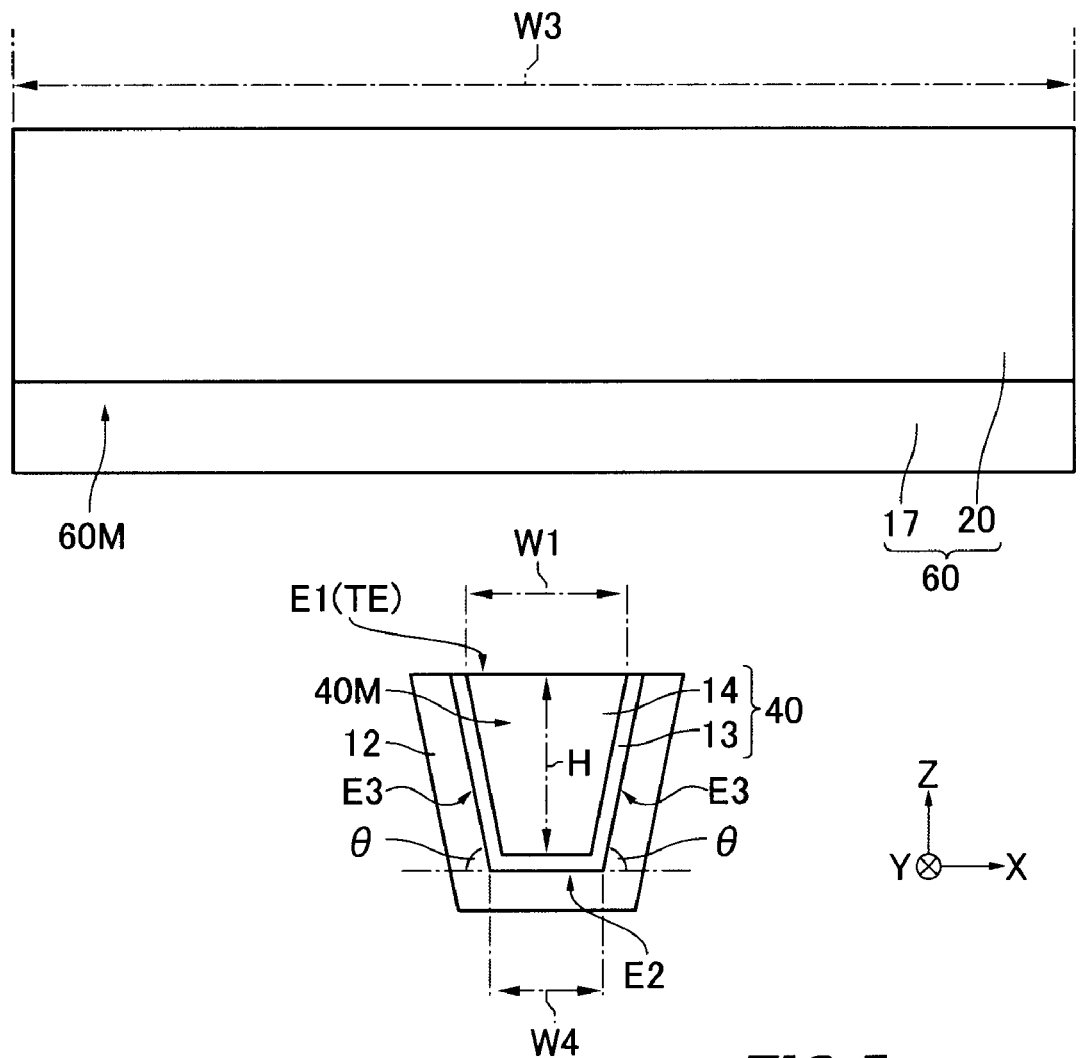
FIG. 5 is an end view showing a magnetic pole structure of the perpendicular recording element of the magnetic head shown in FIGS. 1 to 4.

An end face 40M of the main magnetic pole film 40 on the side close to the air bearing surface 70 is of, for example, an inverted trapezoid shape (height H), whose upper bottom and lower bottom are the longer side on the trailing side and the shorter side on the leading side, respectively, as shown in FIG. 5. Concretely, the end face 40M has a shape defined by an upper end edge E1 (width W1) on the trailing side, a lower end edge E2 (width W4) on the leading side, and two side edges E3, wherein the width W4 is smaller than the width W1. The upper end edge E1 is a substantial recording portion of the magnetic pole film 50, and its width W1 is approximately 0.2 μm or less. The bevel angle θ of the end face 40M (or angle between a direction along which the lower end edge E2 extends and the side edge E3) may be set arbitrarily, for example, within the range of less than 90 degrees.

The gap film 16 is a gap for magnetically separating the magnetic pole film 50 and the magnetic film 60 and is made of, for example, a non-magnetic insulating material such as alumina or a non-magnetic conductive material such as ruthenium. The thickness of the gap film 16 is approximately 0.03 to 0.1 μm.

The coil film 18 functions to generate a magnetic flux and is made of, for example, a highly conductive material such as copper (Cu). The coil film 18 is wound around the back gap 16BG to have a winding structure (or spiral structure), as shown in FIG. 2.

The insulating film 19 functions to electrically separate the coil film 18 from the surroundings and is made of, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called "throat height TH". For example, FIG. 2 shows a state where the throat height zero position TP matches the flare point FP.

The magnetic film 60 functions to absorb a spreading component of a magnetic flux emitted from the magnetic pole film 50 so as to increase the gradient of the perpendicular magnetic field and also absorb a magnetic flux returning from the recording medium so as to circulate the magnetic flux between the recording head portion 100B and a magnetic recording medium 80. The magnetic film 60, which extends rearward from the air bearing surface 70 on the trailing side of the magnetic pole film 50, is separated from the magnetic pole film 50 by the gap film 16 at its front but connected to the magnetic pole film 50 through the back gap 16BG at its rear. On the side close to the air bearing surface 70, the magnetic film 60 has an end face 60M which is, for example, of a rectangular shape having a width W3 larger than the width W1, as shown in FIG. 2. The magnetic film 60 includes, for example, a write shield film 17 and a return yoke film 20 which are distinct from each other.

The write shield film 17 functions to mainly increase the gradient of the perpendicular magnetic field and is made of, for example, a high saturation magnetic flux density material such as a nickel (Ni)-iron alloy or an iron-based alloy. Particularly by absorbing a spreading component of a magnetic flux emitted from the magnetic pole film 50, the write shield film 17 functions to: (1) increase the magnetic field gradient of the perpendicular magnetic field; (2) decrease the recording width; and (3) incorporate an oblique magnetic field component into the perpendicular magnetic field. However, the write shield film 17 may additionally function to circulate the magnetic flux like the return yoke film 20. The write shield film 17 is adjacent to the gap film 16 and extends rearward from the air bearing surface 70 to have its rear end adjacent to the insulating film 19. Thus, the write shield film 17 serves to define the forefront position (throat height zero position TP) of the insulating film 19.

The return yoke film 20 functions to circulate the magnetic flux and is made of, for example, a magnetic material similar to that of the write shield film 17. The return yoke film 20 extends from the air bearing surface 70, through above the insulating film 19, to the back gap 16BG on the trailing side of the write shield film 17 and is connected to the write shield film 17 at its front but to the magnetic pole film 50 at its rear through the back gap 16BG, as shown in FIG. 4.

The overcoat film 21 functions to protect the magnetic head and is made of, for example, a non-magnetic insulating material such as alumina.

Next will be detailed the configuration of the main magnetic pole film 40 being a feature of the present invention. The electrode film 13, which functions as a seed film upon formation of the main magnetic pole film 40 as a plated film 14, is different in film thickness between a portion used as a seed film for plating the small width portion 40A, which functions as a perpendicular magnetic field emitting portion, and a portion used as a seed film for plating the large width portion 40B, which supplies a magnetic flux to the small width portion 40A.

The fact that the electrode film 13 is different in film thickness between beneath the small width portion 40A and beneath the large width portion 40B means that plating is performed at different current densities for the small width portion 40A and the large width portion 40B. The fact that plating is performed at different current densities means that the plated film formed thereon varies in composition ratio, though made of the same materials. This results in that the small width portion 40A for emitting a perpendicular magnetic field and the large width portion 40B for supplying a magnetic flux to the small width portion 40A have different magnetic properties.

Figure 6:
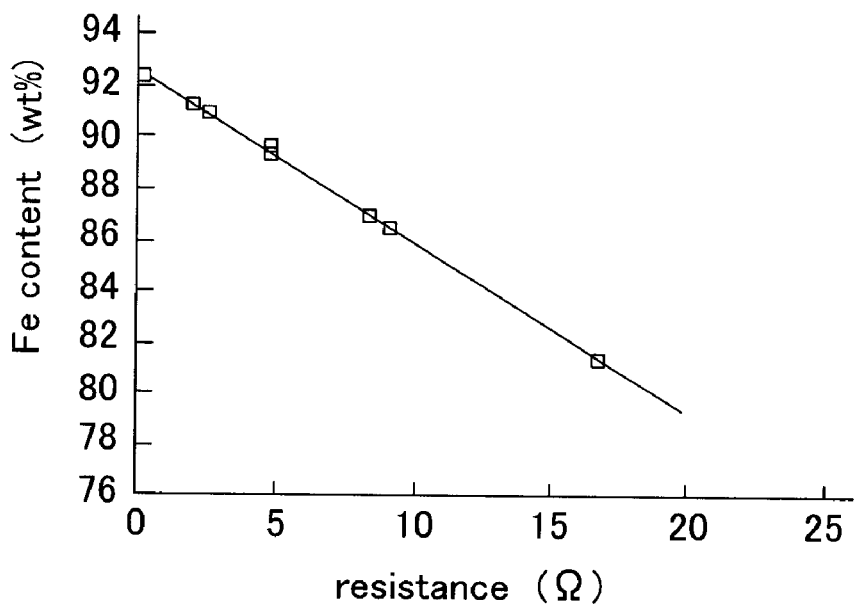
FIG. 6 is a graph showing a relation between an electrical resistance of an electrode film, which functions as a seed film, and a Fe component in a plated film.

The main magnetic pole film 40 of the perpendicular recording element is formed by a plated film 14 typically containing Fe. In a case of a plated film containing Fe, e.g., a FeCoNi plated film, as shown in FIG. 6, for example, the Fe content in the formed plated film 14 decreases with an increase in the electrical resistance of the electrode film 13, which functions as a seed film. The electrical resistance of the electrode film 13 increases with decreasing its film thickness.

Figure 7:
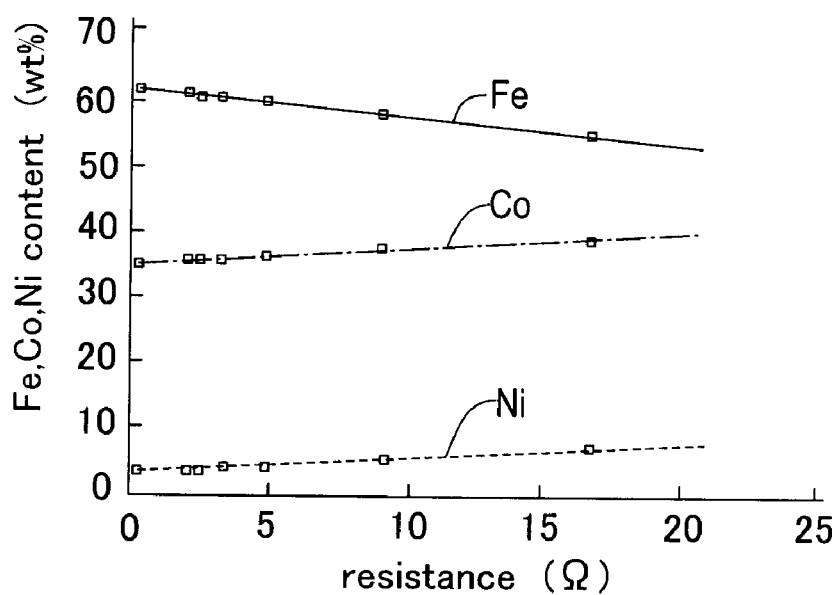
FIG. 7 is a graph showing a relation between an electrical resistance of an electrode film, which functions as a seed film, and relative proportions of Fe, Co and Ni components in a plated film.

As a result, in the case of the FeCoNi plated film, the relative proportion of the Fe component in the formed plated film 14 decreases and the relative proportions of the Co and Ni components inversely increase with an increase in the electrical resistance of the electrode film 13, as illustrated in FIG. 7.

That is, the relative proportion of the Fe component in the plated film 14 formed on the electrode film 13 varies depending on the film thickness of the electrode film 13, and the saturation magnetic flux density and the coercive force of the plated film 14 are determined accordingly.

In the present invention, since the electrode film 13 is different in film thickness between beneath the small width portion 40A and beneath the large width portion 40B, the relative proportion of the Fe component in a portion of the plated film 14 forming the small width portion 40A differs from the relative proportion of the Fe component in a portion of the plated film 14 forming the large width portion 40B, resulting in that the small width portion 40A and the large width portion 40B differ from each other in saturation magnetic flux density and coercive force.

Next will be specifically described adjustment of saturation magnetic flux density and coercive force in the small width portion 40A and the large width portion 40B with reference to FIGS. 8 to 12.

Figure 8:
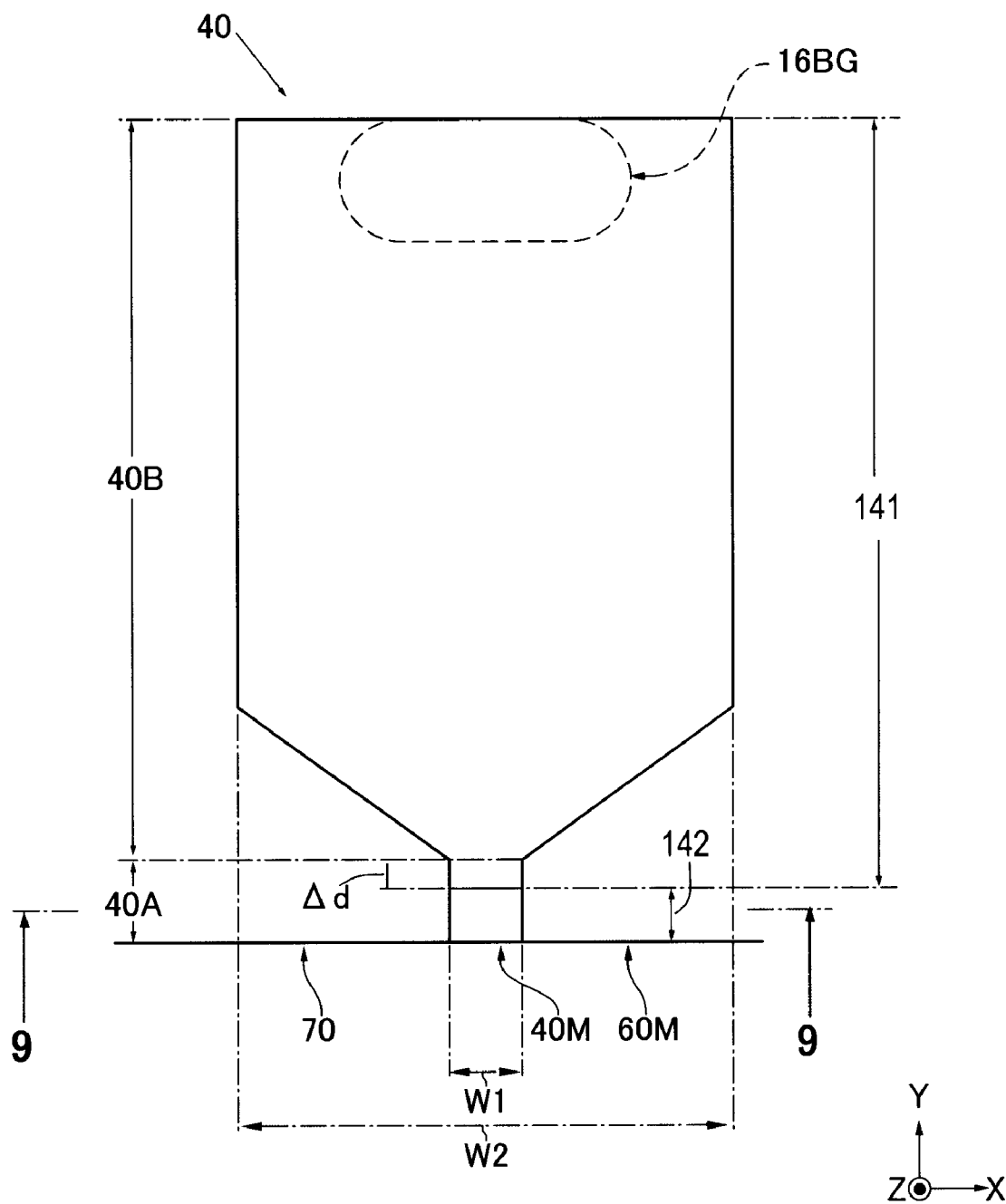
FIG. 8 is a plan view of a main magnetic pole film in the magnetic head shown in FIGS. 1 to 5.
Figure 9:
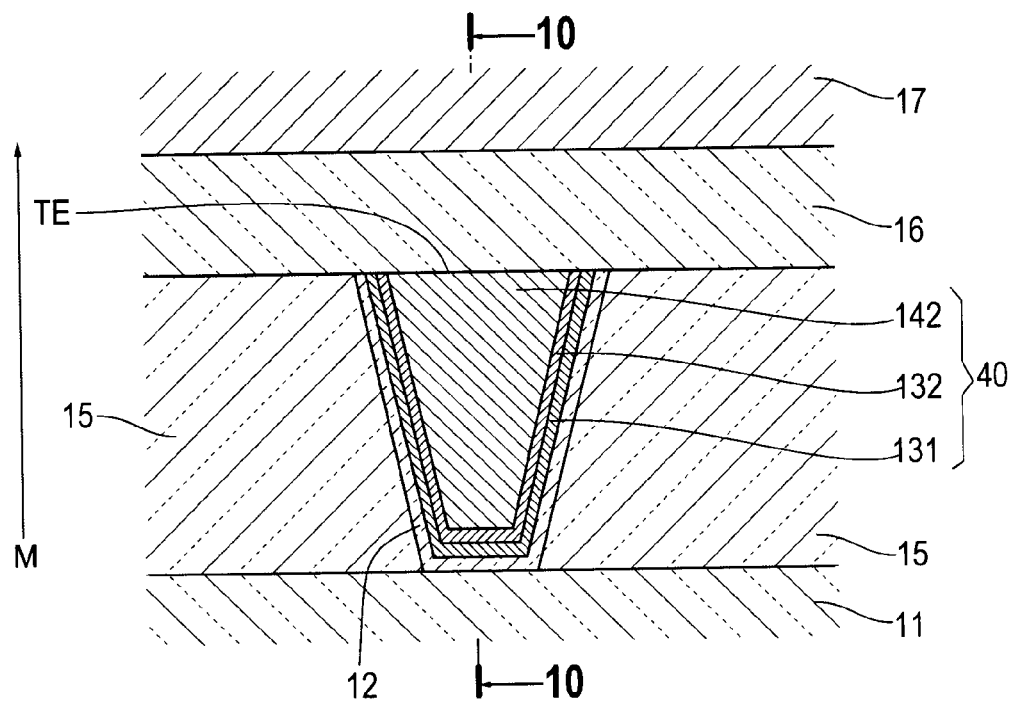
FIG. 9 is a sectional view taken along line 9-9 in FIG. 8.
Figure 10:
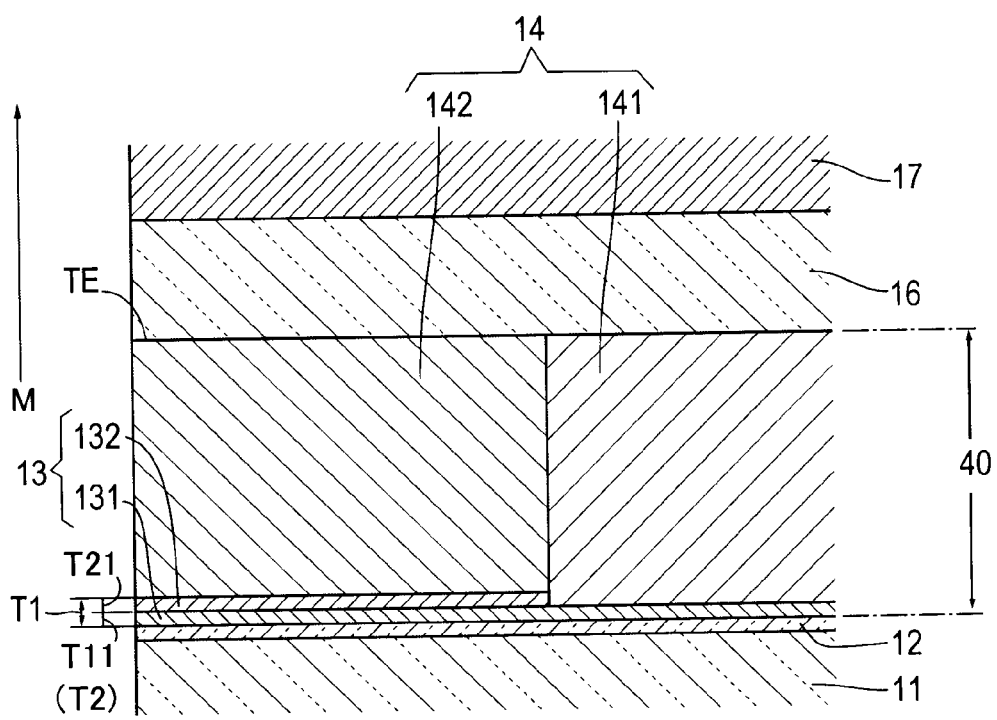
FIG. 10 is a sectional view taken along line 10-10 in FIG. 9.
Figure 11:
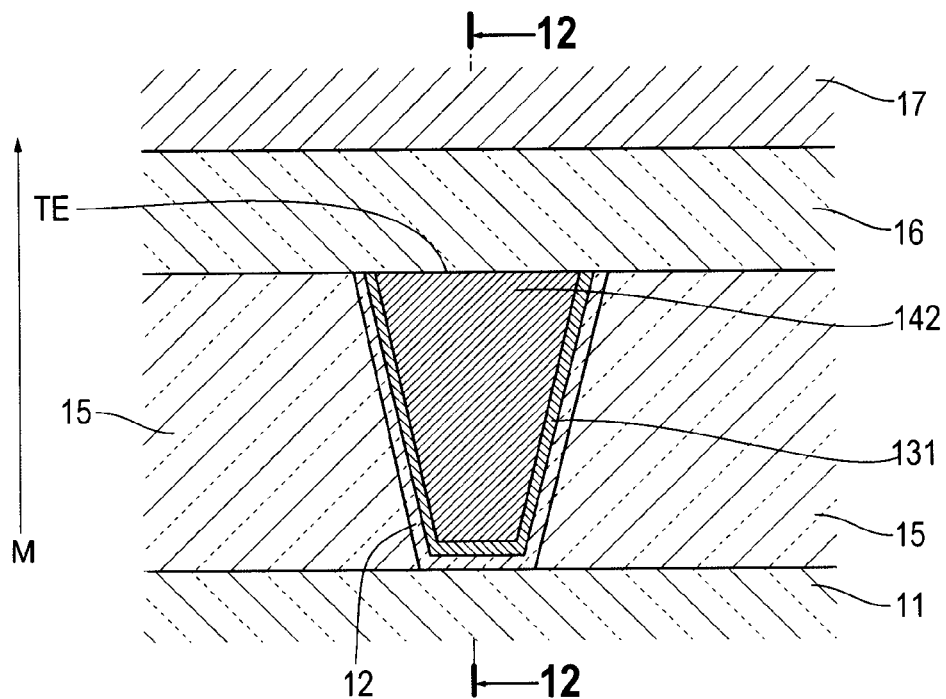
FIG. 11 is a sectional view of a main magnetic pole film in another embodiment of a magnetic head according to the present invention.
Figure 12:
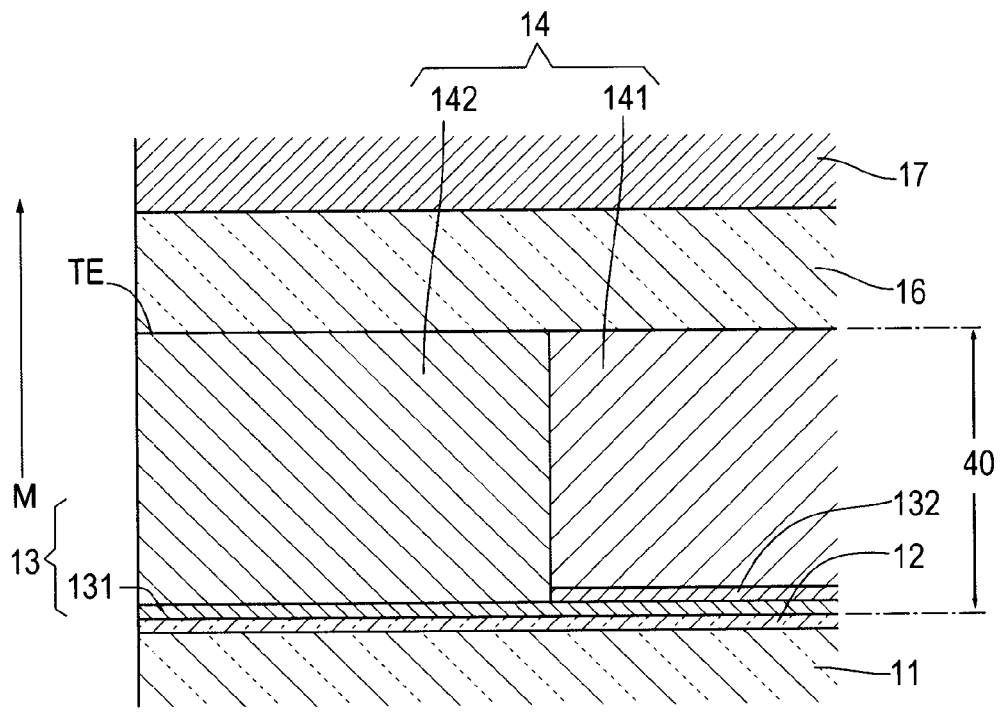
FIG. 12 is a sectional view taken along line 12-12 in FIG. 11.

Referring first to FIGS. 8 to 10, there is illustrated a case where the saturation magnetic flux density is larger in a portion of the plated film forming the small width portion 40A than in a portion of the plated film forming the large width portion 40B, wherein the electrode film 13 satisfies T1>T2, where T1 represents a film thickness at the front end of the small width portion 40A and T2 represents a film thickness in the large width portion 40B. Referring to FIG. 8, a plated film 141 forming the large width portion 40B extends into the rear portion of the small width portion 40A by Δd.

In the small width portion 40A, more specifically, the electrode film 13 has a layered structure of a first electrode film 131 containing Fe and a second electrode film 132 containing Fe and formed on the first electrode film 131, and a plated film 142 is formed thereon. Although not illustrated in the drawings, the first electrode film 131 is composed of a magnetic film including Fe formed on an adhesive layer such as of titanium (Ti), which is sputtered on the second non-magnetic film 12. This technique is a common practice and, even though no reference is made thereto, applicable to any of the embodiments.

In the large width portion 40B, the electrode film 13 is formed only by the first electrode film 131 made of Ti, and a plated film 141 is formed thereon. In this case, the film thickness T1 in the small width portion 40A is a sum of a film thickness T11 of the first electrode film 131 and a film thickness T21 of the second electrode film 132, and the film thickness T2 of the electrode film in the large width portion 40B is equal to the film thickness T11 of the first electrode film 131, thereby satisfying T1>T2.

Because of the above difference between the film thicknesses T1 and T2, in a case where the main magnetic pole film 40 has a typical composition containing at least one element of Fe, Co and Ni, the Fe content at the front end of the plated film 142 forming the small width portion 40A, which functions as a perpendicular magnetic field emitting portion, becomes larger than the Fe content in the plated film 141 forming the large width portion 40B. This increases the saturation magnetic flux density of the small width portion 40A to improve the overwrite characteristic.

From the practical viewpoint, the difference between the film thicknesses T1 and T2 is preferably set such that the main magnetic pole film 40 satisfies $$C1-C2 \geq 4 \text{wt. \%},$$

where C1 (wt. %) represents a Fe content in the plated film 142 of the small width portion 40A and C2 (wt. %) represents a Fe content in the plated film 141 of the large width portion 40B.

Next will be described a case where the coercive force is smaller in the plated film 142 of the small width portion 40A than in the plated film 141 of the large width portion 40B. In this case, the film thickness relation of the electrode film 13 between the small width portion 40A and the large width portion 40B is reversed from the above. That is, the relation between the film thickness T1 of the electrode film 13 in the small width portion 40A and the film thickness T2 in the large width portion 40B is set to satisfy T1<T2.

For example, in the large width portion 40B, as illustrated in FIGS. 9 and 10, the electrode film 13 has a layered structure of a first electrode film 131 composed of a magnetic film containing Fe and a second electrode film 132 containing Fe formed on the first electrode film 131, and a plated film 141 is formed thereon. In the small width portion 40A, the electrode film is formed only by the first electrode film 131 made of Ti, and a plated film 142 is formed thereon. That is, the film thickness T1 of the electrode film in the small width portion 40A is equal to a film thickness T11 of the first electrode film, and the film thickness T2 of the electrode film in the large width portion 40B is a sum of the film thickness T11 of the first electrode film and a film thickness T21 of the second electrode film.

Because of the above difference between the film thicknesses T1 and T2, in a case where the main magnetic pole film 40 has a typical composition containing at least one element of Fe, Co and Ni, the Fe content in the plated film 142 forming the small width portion 40A, which functions as a perpendicular magnetic field emitting portion, becomes smaller than the Fe content in the plated film 141 forming the large width portion 40B. This decreases the coercive force of the small width portion 40A to improve the pole erase.

From the practical viewpoint, the difference between the film thicknesses T1 and T2 is preferably set such that the main magnetic pole film 40 satisfies $$C2-C1 \geq 4\text{wt. \%},$$

where C1 (wt. %) represents a Fe content in the plated film 142 of the small width portion 40A and C2 (wt. %) represents a Fe content in the plated film 141 of the large width portion 40B.

Next the description will be made with reference to experimental data. Table 1 shows experimental results about the effects of the film thickness of the electrode film 13 on the overwrite characteristic (OW), the pole erase (PE) and the film peeling for samples of the magnetic head shown in FIGS. 1 to 12. For respective Samples S1 to S11, one hundred samples were used in an experiment.

In Table 1, Samples S1 to S8 were magnetic heads in which the plated film 142 of the small width portion 40A and the plated film 141 of the large width portion 40B were formed by a FeNi plated film.

Among them, Samples S1 and S2 were prepared (as Comparative Examples) such that the electrode film 13 was formed by a 50-nm thick FeCo film and then the plated film 142 of the small width portion 40A and the plated film 141 of the large width portion 40B were grown thereon at once. The overall film thickness of the electrode film 13 was 50 nm in both the small width portion 40A and the large width portion 40B. The electrode film 13 was a sputtered film.

Samples S3 to S5 were prepared (as Examples of FIGS. 11 and 12) such that in the large width portion 40B, the electrode film 13 was formed as a layered film composed of a FeCo film being the first electrode film 131 and a FeCo film being the second electrode film 132 and then the plated film 141 of the large width portion 40B was grown thereon, while in the small width portion 40A, the electrode film 13 was formed only by a FeCo film being the first electrode film 131 and then the plated film 142 of the small width portion 40A was grown thereon.

Samples S6 to S8 were prepared (as Examples of FIGS. 9 and 10) such that in the small width portion 40A, the electrode film 13 was formed as a layered film composed of a FeCo film being the first electrode film 131 and a FeCo film being the second electrode film 132 and then the plated film 142 of the small width portion 40A was grown thereon, while in the large width portion 40B, the electrode film 13 was formed only by a FeCo film being the first electrode film 131 and then the plated film 141 of the large width portion 40B was grown thereon.

Samples S9 to S11 were magnetic heads in which the plated film 142 of the small width portion 40A and the plated film 141 of the large width portion 40B were formed by a FeCoNi plated film. Sample S9 was prepared (as Comparative Example) such that the electrode film 13 was formed by a FeCo film and then the plated film 142 of the small width portion 40A and the plated film 141 of the large width portion 40B were grown thereon at once. The overall film thickness of the electrode film 13 was 50 nm in both the small width portion 40A and the large width portion 40B.

Samples S10 were prepared (as Example of FIGS. 11 and 12) such that in the large width portion 40B, the electrode film 13 was formed as a layered film composed of a FeCo film being the first electrode film 131 and a FeCo film being the second electrode film 132 and then the plated film 141 of the large width portion 40B was grown thereon, while in the small width portion 40A, the electrode film 13 was formed by a FeCo film being the first electrode film 131 and then the plated film 142 of the small width portion 40A was grown thereon.

Samples S11 were prepared (as Example of FIGS. 9 and 10) such that in the small width portion 40A, the electrode film 13 was formed as a layered film composed of a FeCo film being the first electrode film 131 and a FeCo film being the second electrode film 132 and then the plated film 142 of the small width portion 40A was grown thereon, while in the large width portion 40B, the electrode film 13 was formed only by a FeCo film being the first electrode film 131 and then the plated film 141 of the large width portion 40B was grown thereon. Both the first electrode film 131 and the second electrode film 132 were a sputtered film. Film thicknesses of each electrode film are shown in table 1.

The pole erase (PE) expresses the ratio of samples ranked A or B to all samples in percentage, where samples are ranked A when the number of sectors having caused an error during writing onto a magnetic recording medium is "0", and ranked B when less than 6%. The coercive force Hch is a value along the hard axis, while the coercive force Hce is a value along the easy axis.

TABLE 1

| Sample | Film thickness of electrode film | | Plated film of large width portion 40B | | | | | | Plated film of small width portion 40A | | | | | | Properties | |
|---|---|---|---|---|---|---|---|---|---|---|---|---|---|---|---|---|
| | 40B nm | 40A nm | Fe wt. % | Co wt. % | Ni wt. % | Bs T | Hce Oe | Hch Oe | Fe wt. % | Co wt. % | Ni wt. % | Bs T | Hce Oe | Hch Oe | OW dB | PE % |
| S1 | 50 | 50 | 90 | | 10 | 2.1 | 3.0 | 2.0 | 90 | | 10 | 2.1 | 3.0 | 2.0 | 33 | 80 |
| S2 | 50 | 50 | 80 | | 20 | 2.0 | 2.0 | 0.5 | 80 | | 20 | 2.0 | 2.0 | 0.5 | 30 | 98 |
| S3 | 50 | 20 | 90 | | 10 | 2.1 | 3.0 | 2.0 | 88 | | 12 | 2.1 | 2.7 | 1.6 | 33 | 82 |
| S4 | 50 | 10 | 90 | | 10 | 2.1 | 3.0 | 2.0 | 85 | | 15 | 2.0 | 2.0 | 0.8 | 32 | 90 |
| S5 | 50 | 5 | 90 | | 10 | 2.1 | 3.0 | 2.0 | 80 | | 20 | 2.0 | 2.0 | 0.5 | 32 | 95 |
| S6 | 20 | 50 | 89 | | 11 | 2.1 | 2.8 | 1.6 | 90 | | 10 | 2.1 | 3.0 | 2.0 | 34 | 80 |
| S7 | 10 | 50 | 86 | | 14 | 2.0 | 2.1 | 1.0 | 90 | | 10 | 2.1 | 3.0 | 2.0 | 37 | 79 |
| S8 | 5 | 50 | 81 | | 19 | 2.0 | 2.0 | 0.6 | 90 | | 10 | 2.1 | 3.0 | 2.0 | 37 | 80 |
| S9 | 50 | 50 | 65 | 32 | 3 | 2.3 | 10.0 | 2.5 | 65 | 32 | 3 | 2.3 | 10.0 | 2.5 | 40 | 65 |

TABLE 1-continued

| | Film thickness of electrode film | | Plated film of large width portion 40B | | | | | | Plated film of small width portion 40A | | | | | | Properties | |
|---|---|---|---|---|---|---|---|---|---|---|---|---|---|---|---|---|
| Sample | 40B nm | 40A nm | Fe wt. % | Co wt. % | Ni wt. % | Bs T | Hce Oe | Hch Oe | Fe wt. % | Co wt. % | Ni wt. % | Bs T | Hce Oe | Hch Oe | OW dB | PE % |
| S10 | 50 | 6 | 70 | 28 | 2 | 2.2 | 8.0 | 2.4 | 65 | 32 | 3 | 2.3 | 10.0 | 2.5 | 43 | 64 |
| S11 | 6 | 50 | 65 | 32 | 3 | 2.3 | 10.0 | 2.5 | 70 | 28 | 2 | 2.2 | 8.0 | 2.4 | 39 | 75 |

Referring to Table 1, it is clear from the comparison between Samples S1 and S2 (both conventional ones), in which the film thickness of the electrode film was 50 nm in both the small width portion 40A and the large width portion 40B, that as the Fe content increases in the plated film 142 of the small width portion 40A and the plated film 141 of the large width portion 40B, the saturation magnetic flux density Bs increases to improve the overwrite characteristic (OW), but the pole erase (PE) deteriorates (see Sample 1).

As the Fe content decreases in the plated film 142 of the small width portion 40A and the plated film 141 of the large width portion 40B, on the other hand, the coercive force Hc decreases to improve the pole erase (PE), but the saturation magnetic flux density Bs decreases to deteriorate the overwrite characteristic (OW) (see Sample 2).

That is, in the case where the film thickness of the electrode film in the small width portion 40A is equal to the film thickness of the electrode film in the large width portion 40B, the improvement in overwrite characteristic (OW) cannot be reconciled with the improvement in pole erase (PE).

In Samples S3 to S5, in which the electrode film 13 in the large width portion 40B was formed by layering the first and second electrode films 131, 132 to have a film thickness of 50 nm and the plated film 141 of the large width portion 40B was grown thereon while the electrode film 13 in the small width portion 40A was formed only by the first electrode film 131 and the plated film 142 of the small width portion 40A was grown thereon, on the other hand, the pole erase (PE) was improved up to 95%. This may be because the coercive force Hc decreased from the large width portion 40B to the small width portion 40A, as shown in Table 1, thereby reducing the residual magnetic flux in the small width portion 40A. Also in comparison with Samples 1 and 2, there was little decrease in the saturation magnetic flux density Bs, providing a similar overwrite characteristic (OW).

In Samples S6 to S8, in which the electrode film 13 in the small width portion 40A was formed by layering the first and second electrode films 131, 132 and the plated film 142 of the small width portion 40A was grown thereon while the electrode film 13 in the large width portion 40B was formed only by the first electrode film 131 and the plated film 141 of the large width portion 40B was grown thereon, on the other hand, the overwrite characteristic (OW) was improved up to 37 dB. This may be because the saturation magnetic flux density Bs gradually increased from the large width portion 40B to the small width portion 40A, as shown in Table 1, thereby facilitating concentration of magnetic flux at the front end of the small width portion 40A.

In Sample S9, meanwhile, the overwrite characteristic (OW) was improved by resulting high saturation magnetic flux density Bs, but the pole erase (PE) was deteriorated.

In Sample S10, in which the electrode film 13 in the large width portion 40B was formed by layering the first and second electrode films 131, 132 to have a film thickness of 50 nm and the plated film 141 of the large width portion 40B was grown thereon while the electrode film 13 in the small width portion 40A was formed only by the first electrode film 131 and the plated film 142 of the small width portion 40A was grown thereon, on the other hand, the overwrite characteristic (OW) was considerably improved in comparison with Sample S9. This may be because the saturation magnetic flux density Bs increased from the large width portion 40B to the small width portion 40A, as shown in Table 1, thereby facilitating concentration of magnetic flux at the small width portion 40A. Regarding the pole erase, there was little decrease in the coercive force Hc in comparison with Sample S9 and there was little change in the residual magnetic flux at the small width portion of the magnetic pole, providing a similar pole erase (PE) to that of Sample S9.

In Sample S11, in which the electrode film 13 in the small width portion 40A was a layered film of the first and second electrode films 131, 132 and the plated film 142 of the small width portion 40A was grown thereon while the electrode film 13 in the large width portion 40B was formed only by the first electrode film 131 and the plated film 141 of the large width portion 40B was grown thereon, the pole erase (PE) was significantly improved. This may be because the coercive force Hc decreased much more in the plated film 142 of the small width portion 40A than in the plated film 141 of the large width portion 40B in an application to a magnetic recording/reproducing apparatus such as a hard disk drive (HDD), thereby considerably reducing the residual magnetic flux.

Figure 13:
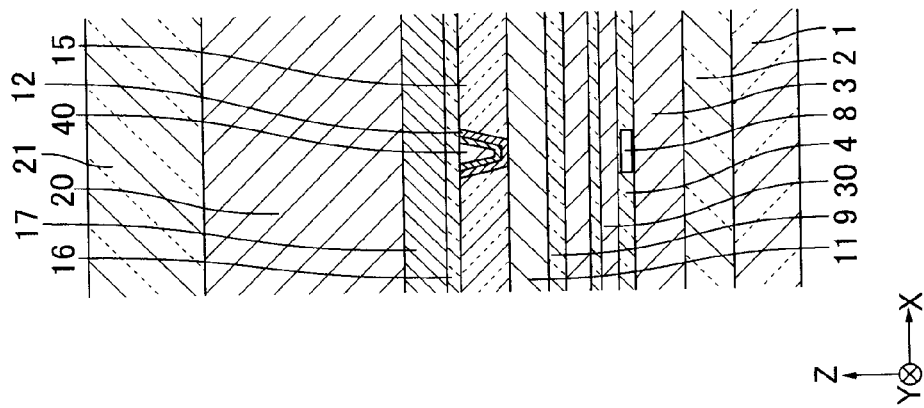
FIG. 13 is a sectional front view showing another embodiment of a magnetic head according to the present invention.

In the embodiments shown in FIGS. 1 to 12, the auxiliary magnetic pole film 10 is disposed on the leading side with respect to the main magnetic pole film 40, but is not necessarily limited thereto. For example, the auxiliary magnetic pole film 10 may be disposed on the trailing side with respect to the main magnetic pole film 40, as shown in FIGS. 13 and 14. In this case, since the auxiliary magnetic pole film 10 is disposed on the main magnetic pole film 40, the gap film 16 is partially removed within the area where the auxiliary magnetic pole film 10 is present.

In addition, a non-magnetic film 22 is embedded around the auxiliary magnetic pole film 10 to substantially define the throat height zero position TP, and an insulating film 23 is disposed between the auxiliary magnetic pole film 10 and the coil film 18 to electrically separate the coil film 18 from the auxiliary magnetic pole film 10. The non-magnetic film 22 and the insulating film 23 are made of, for example, a non-magnetic insulating material similar to that of the non-magnetic films 11, 15. The return yoke film 20 is connected at its rear to the auxiliary magnetic pole film 10. The surfaces of the auxiliary magnetic pole film 10, the write shield film 17 and the insulating film 22 are preferably flattened. In addition, the second non-magnetic film 12 may extend, for example, to a back gap 23BG like the main magnetic pole film 40. Also in this case, the same effects can be obtained.

2. Method for Manufacturing the Magnetic Head

Next will be described a method for manufacturing the magnetic head according to the present invention with reference to FIGS. 15 to 71. The manufacturing method according to the present invention is particularly directed to a perpendicular recording element manufacturing method in the production process of the magnetic head. The processes before the production process of the perpendicular recording element have been known heretofore and do not require specific description. Roughly speaking, it can be manufactured by layering a series of components in order by using a conventional thin-film process including a film formation technique such as plating or sputtering, a patterning technique such as photolithography, an etching technique such as dry etching or wet etching, and a polishing technique such as CMP (chemical mechanical polishing).

Roughly speaking with reference to FIGS. 1 to 14 and so on accordingly, when manufacturing the magnetic head, at first, the insulating film 2 is formed on the substrate 1, and then the lower read shield film 3, the shield gap film 4 embedded with the MR element 8, and the upper read shield film 30 (the upper read shield film portions 5, 7 and the non-magnetic film 6) are deposited on the insulating film 2 in the mentioned order, thereby forming the reproducing head portion 10A.

Subsequently, the separating film 9 is formed on the reproducing head portion 100A, and then the magnetic pole film 50 (the auxiliary magnetic pole film 10, the second non-magnetic film 12, and the main magnetic pole film 40) enclosed with the non-magnetic films 11, 15, the gap film 16, the coil film 18 covered with the insulating film 19, and the magnetic film 60 (the write shield film 17 and the return yoke film 20) are deposited on the separating film 9 in the mentioned order, thereby forming the recording head portion 100B. Finally, the overcoat film 21 is formed on the recording head portion 100B, and then the air bearing surface 70 is formed by using a machining process or a polishing process, thereby completing the magnetic head.

Figure 17:
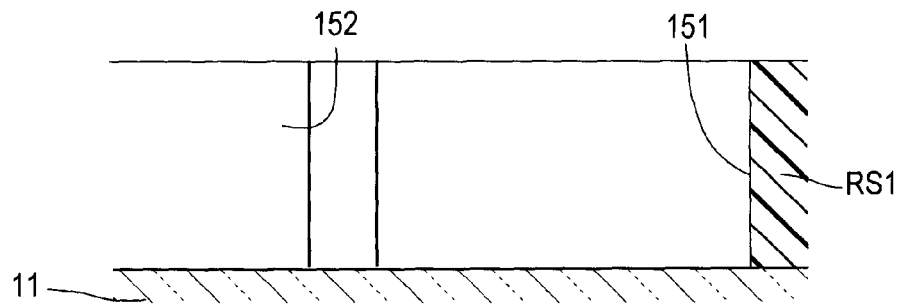
FIG. 17 is a sectional view taken along line 17-17 in FIG. 16.

When manufacturing the perpendicular recording element of the magnetic head, which is the subject of the present invention, at first, after formation of the non-magnetic film 11, a resist pattern RS1 is formed on the non-magnetic film 11, as shown in FIGS. 15 to 17. The resist pattern RS1 may be formed such that a resist is applied onto the non-magnetic film 11 to form a resist film and the resist film is subjected to patterning (exposure and development) by using photolithography. This provides the resist pattern RS1 with a narrow opening 152 for formation of the small width portion 40A and a wide opening 151 for formation of the large width portion 40B, which supplies a magnetic flux to the small width portion 40A.

Figure 18:
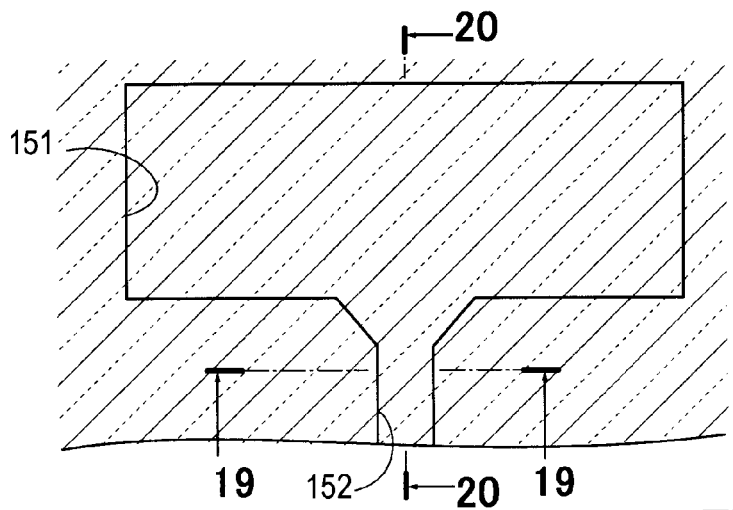
FIG. 18 is a view showing a step after the step shown in FIGS. 15 to 17.
Figure 19:
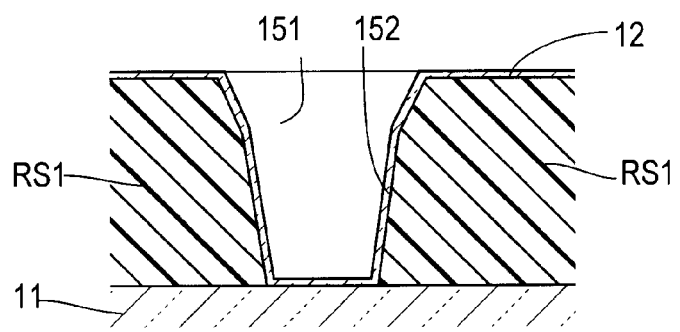
FIG. 19 is a sectional view taken along line 19-19 in FIG. 18.
Figure 20:
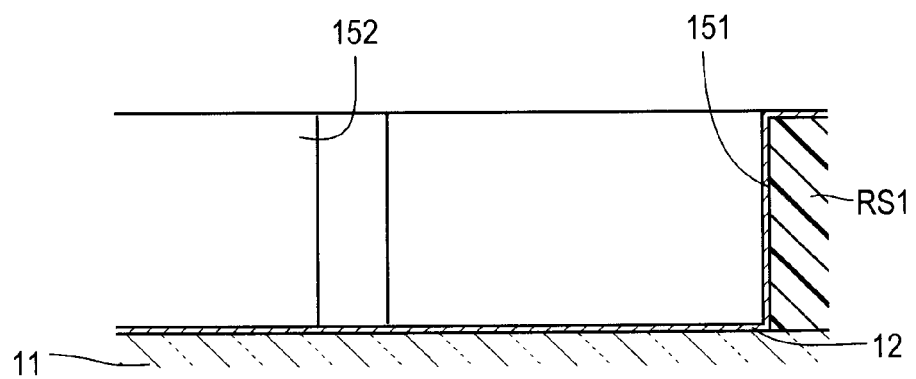
FIG. 20 is a sectional view taken along line 20-20 in FIG. 18.

Next, as shown in FIGS. 18 to 20, the second non-magnetic film 12 is formed in such a manner as to cover at least the inner wall of the resist pattern RS1 in the openings 151, 152 using a dry film formation method. Upon formation of the second non-magnetic film 12, for example, the surface of the resist pattern RS1 and the exposed surface of the non-magnetic film 11 appearing at the bottom of the openings 151, 152 are covered using ALD. Particularly in this case, the film formation temperature (so-called substrate temperature) by ALD should be lower than the deformation temperature (or glass transition temperature) of the resist pattern RS1. Through the use of ALD, the surface of resist pattern RS1 and the exposed surface of the non-magnetic film 11 appearing at the bottom of the openings 151, 152 can be covered by the second non-magnetic film 12 with a uniform thickness.

Figure 21:
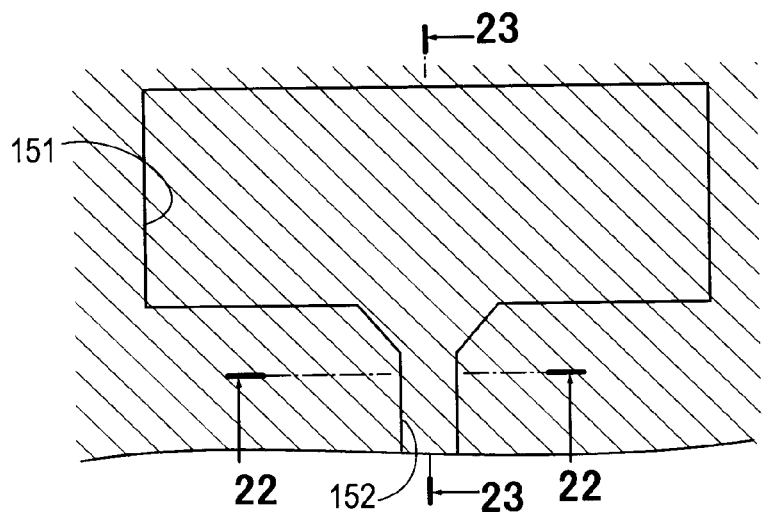
FIG. 21 is a view showing a step after the step shown in FIGS. 18 to 20.
Figure 22:
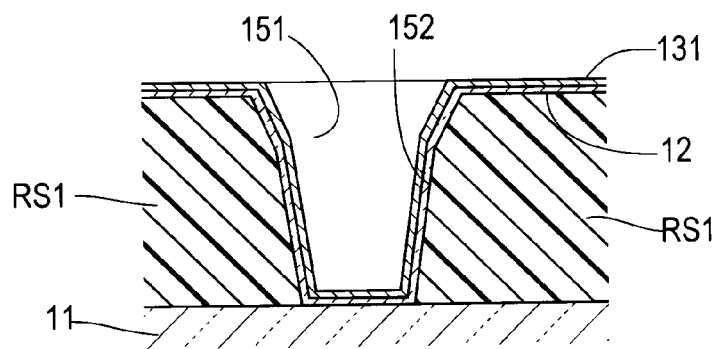
FIG. 22 is a sectional view taken along line 22-22 in FIG. 21.
Figure 23:
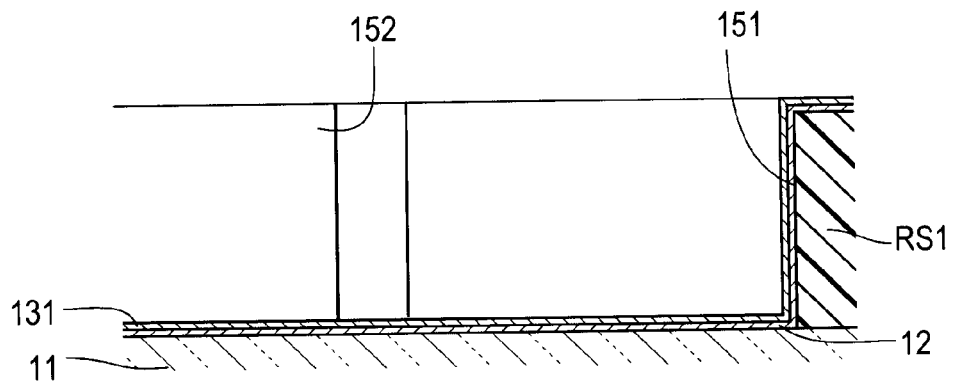
FIG. 23 is a sectional view taken along line 23-23 in FIG. 21.

Then, as shown in FIGS. 21 to 23, the first electrode film 131 is formed on the second non-magnetic film 12 by using sputtering. The first electrode film 131 is a magnetic film containing Fe, for example, a magnetic film such as of FeNi, FeCo or FeCoNi.

Figure 24:
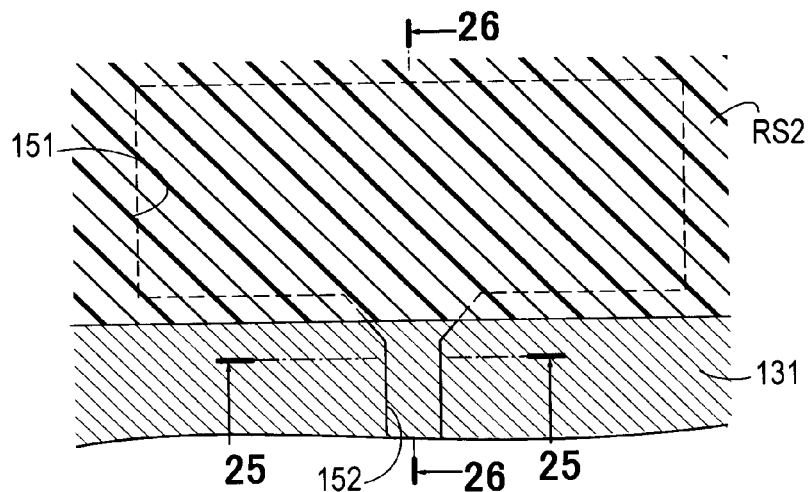
FIG. 24 is a view showing a step after the step shown in FIGS. 21 to 23.
Figure 25:
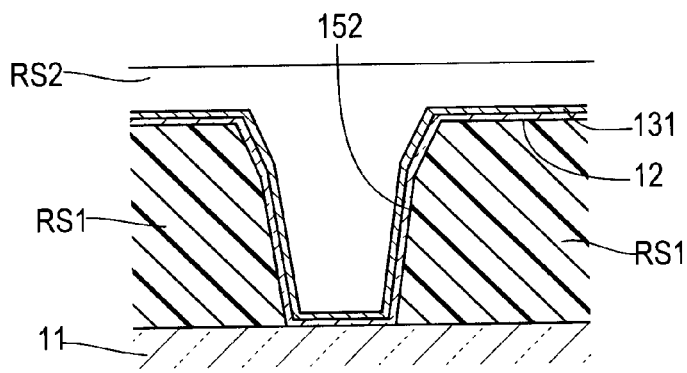
FIG. 25 is a sectional view taken along line 25-25 in FIG. 24.
Figure 26:
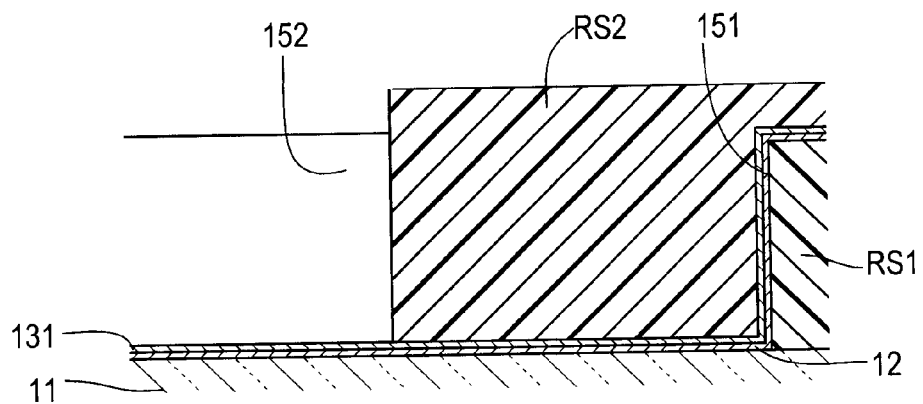
FIG. 26 is a sectional view taken along line 26-26 in FIG. 24.

Next, as shown in FIGS. 24 to 26, a resistmask RS2 is applied over the opening 151 and a part of the opening 152 on its rear end side (on the side close to the opening 151). The resistmask RS2 is formed in such a manner as to entirely cover the first electrode film 131 lying at the bottom of the openings 151, 152 and adhered to the surface of the resist pattern RS1. The front end of the resistmask RS2 is rearwardly spaced a distance y apart from an expected completed air bearing surface (ABS). In order to stabilize the composition in the vicinity of the ABS, the distance y is preferably equal to or greater than 0.2 μm.

Figure 27:
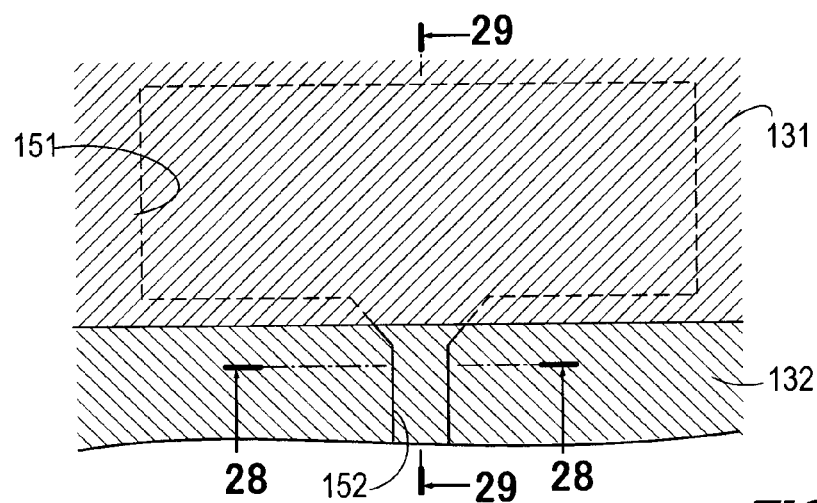
FIG. 27 is a view showing a step after the step shown in FIGS. 24 to 26.
Figure 28:
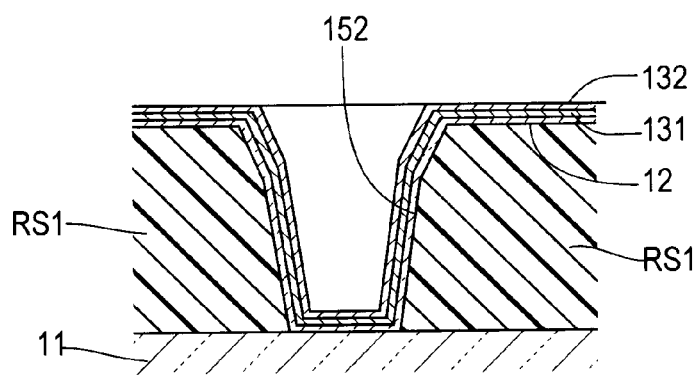
FIG. 28 is a sectional view taken along line 28-28 in FIG. 27.
Figure 29:
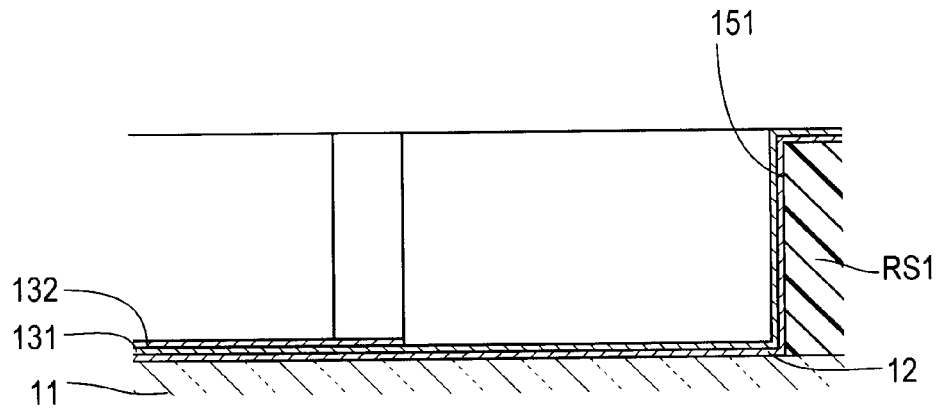
FIG. 29 is a sectional view taken along line 29-29 in FIG. 27.

Then, as shown in FIGS. 27 to 29, the second electrode film 132 is adhered to the surface of the first electrode film 131 by using sputtering, followed by a liftoff process to leave the second electrode film 132 on the bottom of the opening 152. The second electrode film 132 is formed by a magnetic film containing Fe, for example, a magnetic film such as of FeNi, FeCo or FeCoNi. Note that FIGS. 27 to 29 show a state in which the resistmask RS2 is removed from the second electrode film 132.

Figure 30:
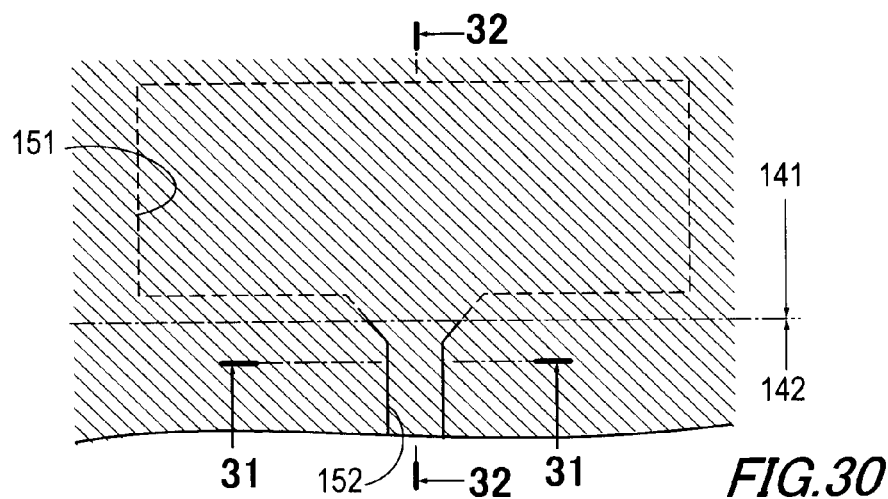
FIG. 30 is a view showing a step after the step shown in FIGS. 27 to 29.
Figure 31:
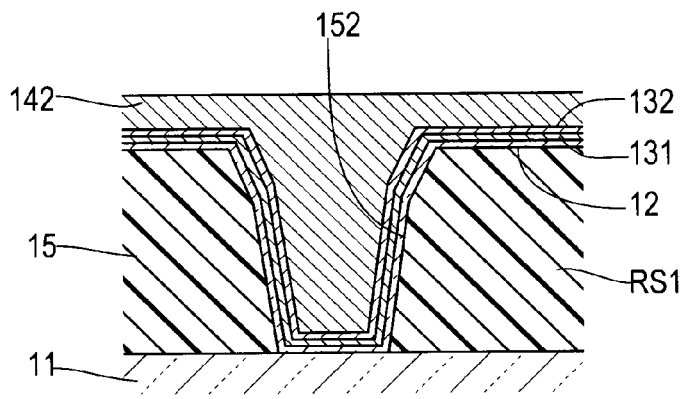
FIG. 31 is a sectional view taken along line 31-31 in FIG. 30.
Figure 32:
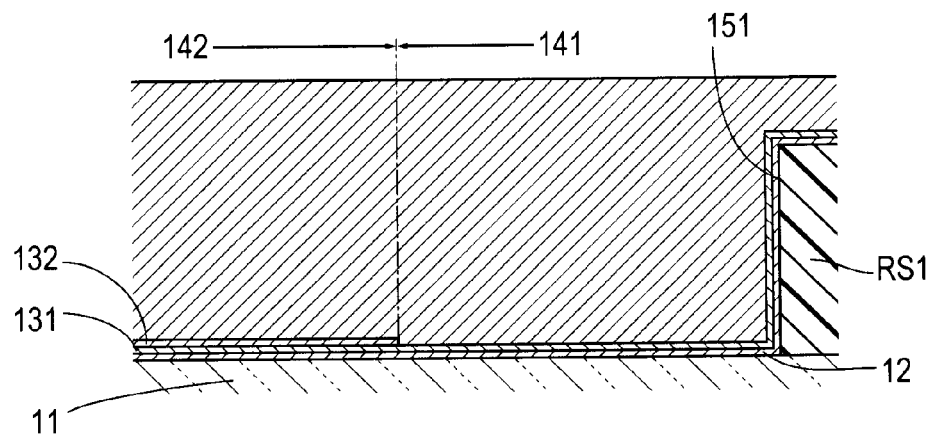
FIG. 32 is a sectional view taken along line 32-32 in FIG. 30.

Next, after removal of the resistmask RS2, as shown in FIGS. 30 to 32, plating is performed to grow the plated films 141, 142 in the opening 151 and the rear end-side part of the opening 152 where the first electrode film 131 is exposed externally. The plated films 141, 142 are also a magnetic film containing Fe, for example, a magnetic film such as of FeNi, FeCo or FeCoNi. Alternatively, the plated films 141, 142 may be formed by separate plating processes.

In the illustrated embodiment, while the plated film 142 in the opening 152 is formed on a layered structure having the first electrode film 131 containing Fe and the second electrode film 132 formed on the first electrode film 131 and containing Fe, the plated film 141 in the opening 151 is formed on the first electrode film 131. Therefore, while the film thickness T1 of the electrode film in the opening 152 is a sum of the film thickness of the first electrode film 131 and the film thickness of the second electrode film 132, the film thickness T2 of the electrode film in the opening 151 is equal to the film thickness of the first electrode film 131, thereby satisfying T1>T2.

Because of the above difference between the film thicknesses T1 and T2, the Fe content in the plated film 142 becomes larger than the Fe content in the plated film 141. This increases the saturation magnetic flux density of the plated film 142 to improve the overwrite characteristic.

As described above, the difference between the film thicknesses T1 and T2 is preferably set to satisfy $C1-C2 \geq 4$ wt. %, where C1 (wt. %) represents a Fe content in the plated film 142 and C2 (wt. %) represents a Fe content in the plated film 141.

Figure 33:
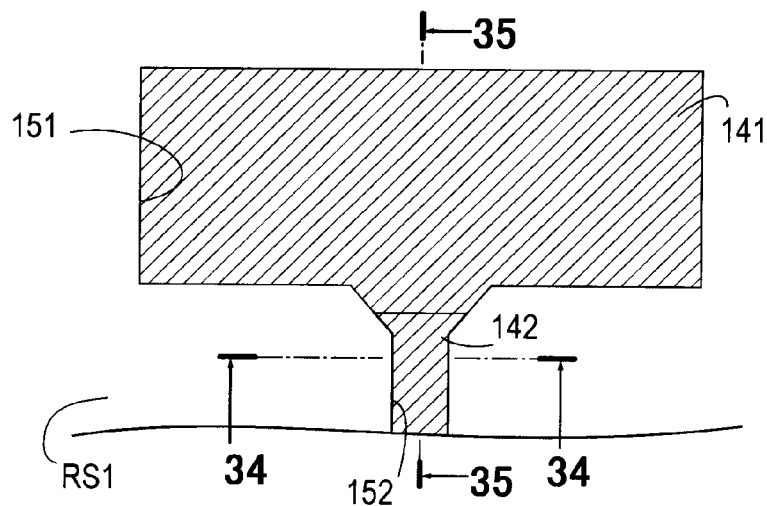
FIG. 33 is a view showing a step after the step shown in FIGS. 30 to 32.
Figure 34:
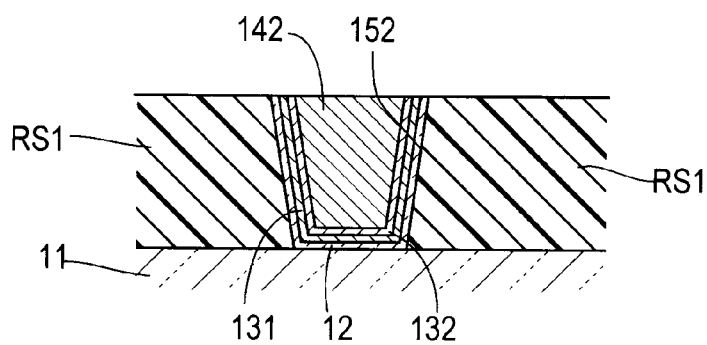
FIG. 34 is a sectional view taken along line 34-34 in FIG. 33.
Figure 35:
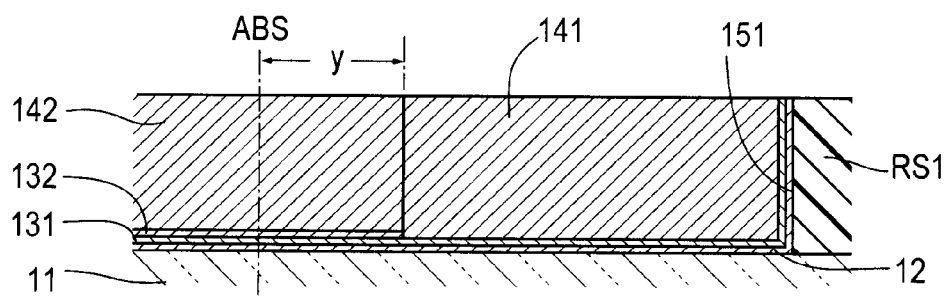
FIG. 35 is a sectional view taken along line 35-35 in FIG. 33.

Next, as shown in FIGS. 33 to 35, the second non-magnetic film 12, the first electrode film 131 and the plated films 141, 142 are selectively removed until at least the resist pattern RS1 is exposed, thereby forming the main magnetic pole film 40 as a magnetic film pattern. As the removal process, for example, a polishing method such as CMP or an etching method such as ion milling or reactive ion etching (RIE) may be adopted.

Figure 36:
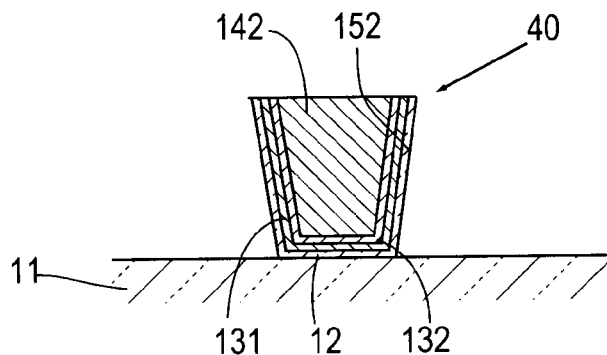
FIG. 36 is a view showing a step after the step shown in FIGS. 33 to 35.
Figure 37:
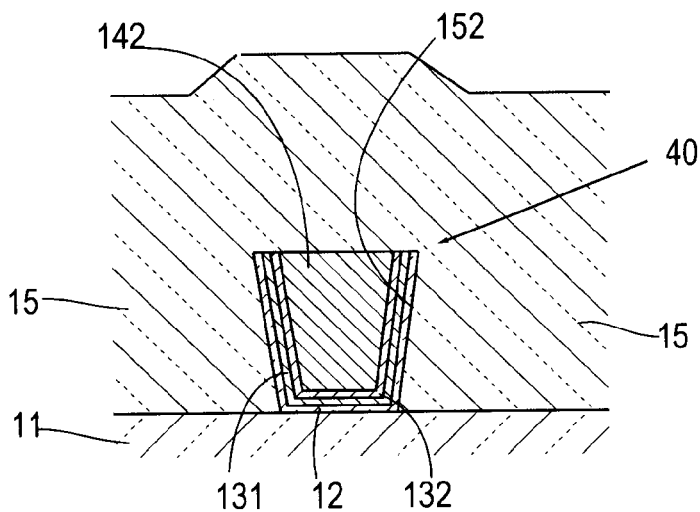
FIG. 37 is a view showing a step after the step shown in FIG. 36.
Figure 38:
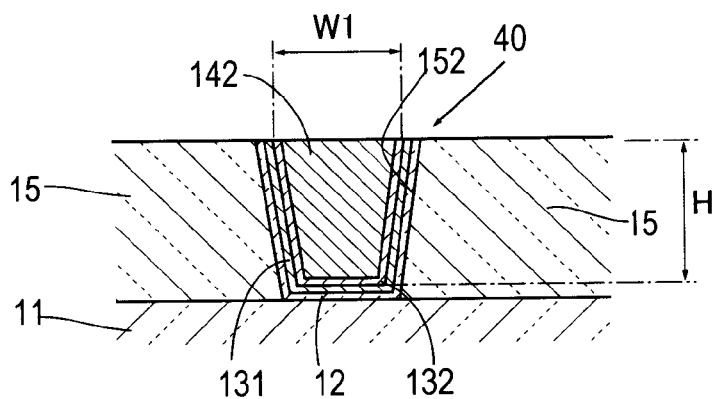
FIG. 38 is a view showing a step after the step shown in FIG. 37.

Then, after the remaining resist pattern RS1 is removed, for example, by using washing with an organic solvent or ashing, as shown in FIG. 36, the first non-magnetic film 15 is formed, for example, by using sputtering to cover the second non-magnetic film 12 and the main magnetic pole film 40, as shown in FIG. 37. Subsequently, the first non-magnetic film 15 is selectively removed (polished) until at least the second non-magnetic film 12 and the main magnetic pole film 40 are exposed, for example, by using CMP, thereby flattening the second non-magnetic film 12, the main magnetic pole film 40 and the first non-magnetic film 15, as shown in FIG. 38. In the polishing process, the polishing amount should be adjusted, for example, to set the width W1 and the height H of the main magnetic pole film 40 to desired values.

Then, after subjected to necessary known processes, e.g., sputtering of the overcoat film 21 such as of $Al_2O_3$ (see FIGS. 3 and 4), the air bearing surface 70 is formed at the next step, thereby forming the end face 40M of the main magnetic pole film 40 and the end face 60M of the magnetic film 60 (see FIGS. 1 to 14). It should be noted that although the small width portion 40A and the large width portion 40B are formed by separate plating processes in this embodiment, they may be formed by a common plating process.

Figure 39:
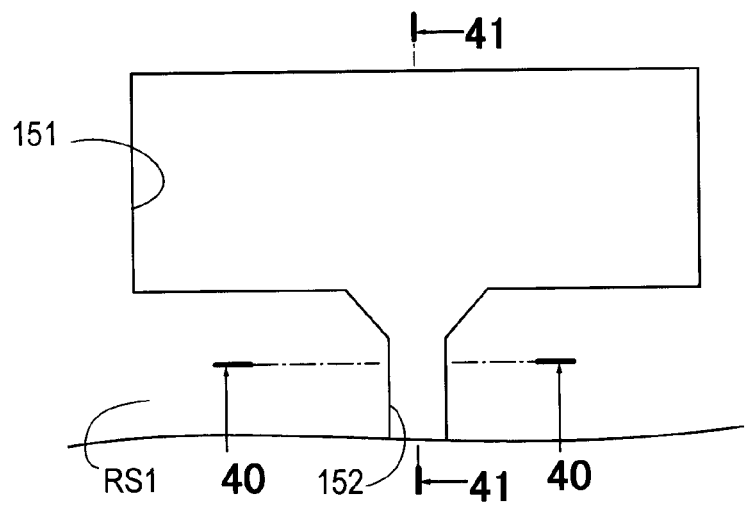
FIG. 39 is a view showing another embodiment of a method for manufacturing a magnetic head according to the present invention.
Figure 40:
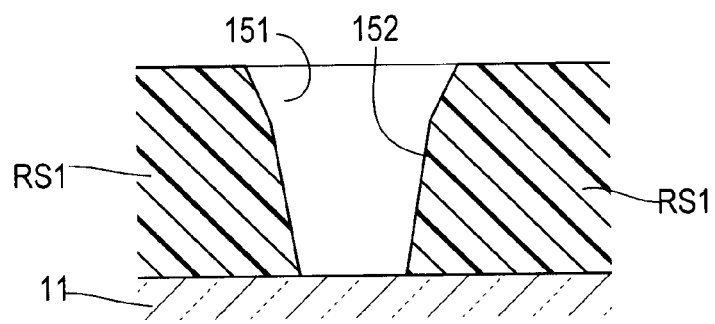
FIG. 40 is a sectional view taken along line 40-40 in FIG. 39.
Figure 41:
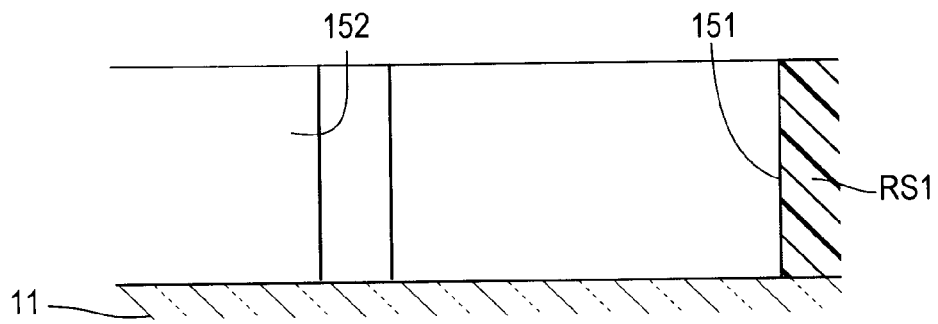
FIG. 41 is a sectional view taken along line 41-41 in FIG. 39.

Next will be described another embodiment of a manufacturing method according to the present invention with reference to FIGS. 39 to 59. At first, after formation of the non-magnetic film 11, a resist pattern RS1 is formed on the non-magnetic film 11 to have a narrow opening 152 for formation of the small width portion 40A and an opening 151 for formation of the large width portion 40B, which supplies a magnetic flux to the small width portion 40A, as shown in FIGS. 39 to 41.

Figure 42:
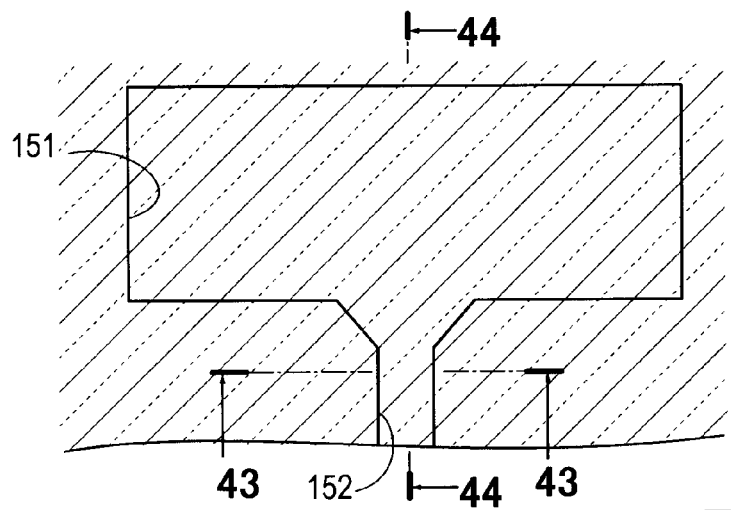
FIG. 42 is a view showing a step after the step shown in FIGS. 39 to 41.
Figure 43:
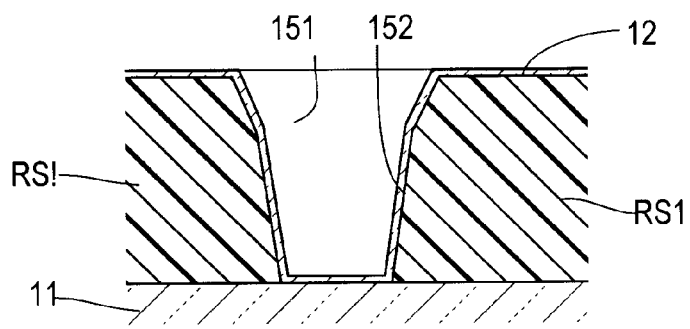
FIG. 43 is a sectional view taken along line 43-43 in FIG. 42.
Figure 44:
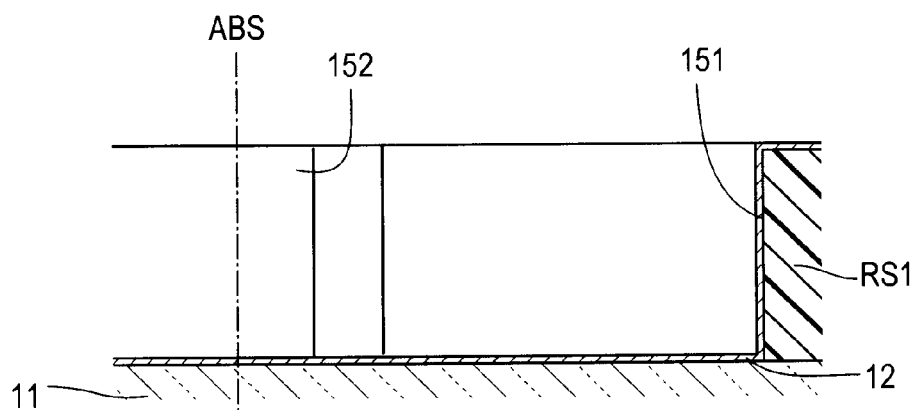
FIG. 44 is a sectional view taken along line 44-44 in FIG. 42.

Next, as shown in FIGS. 42 to 44, the second non-magnetic film 12 is formed in such a manner as to cover at least the inner wall of the resist pattern RS1 in the openings 151, 152 using a dry film formation method. Upon formation of the second non-magnetic film 12, for example, the surface of the resist pattern RS1 and the exposed surface of the non-magnetic film 11 appearing at the bottom of the openings 151, 152 are covered using ALD.

Figure 45:
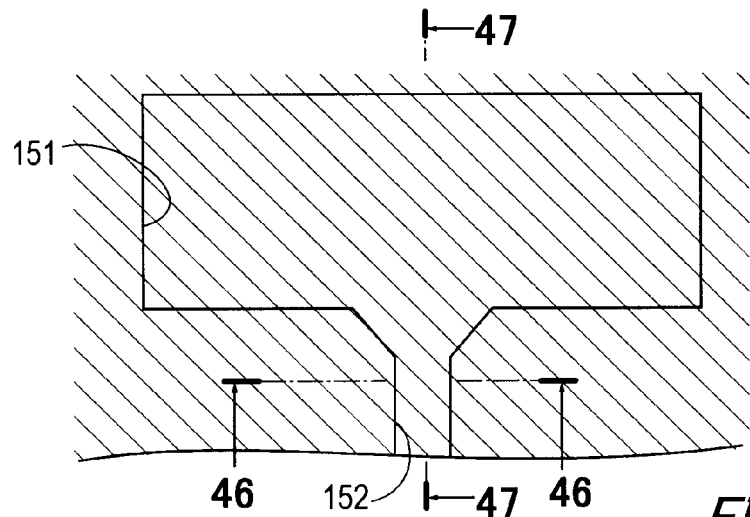
FIG. 45 is a view showing a step after the step shown in FIGS. 42 to 44.
Figure 46:
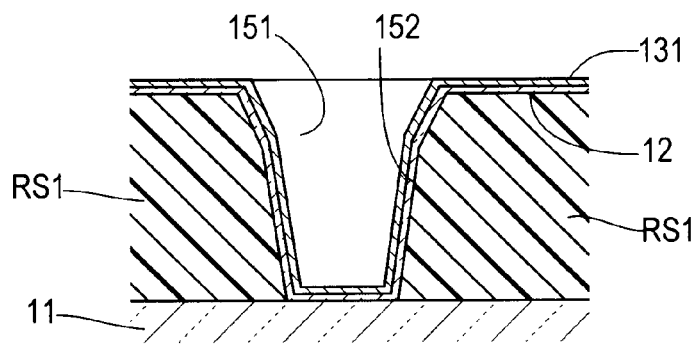
FIG. 46 is a sectional view taken along line 46-46 in FIG. 45.
Figure 47:
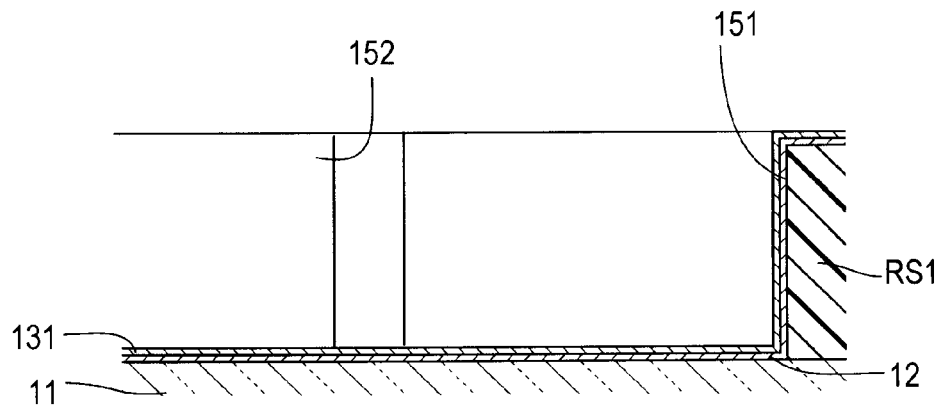
FIG. 47 is a sectional view taken along line 47-47 in FIG. 45.

Then, as shown in FIGS. 45 to 47, the first electrode film 131 is formed on the second non-magnetic film 12 by using sputtering. The first electrode film 131 is a magnetic film containing Fe, for example, a magnetic film such as of FeNi, FeCo or FeCoNi.

Figure 48:
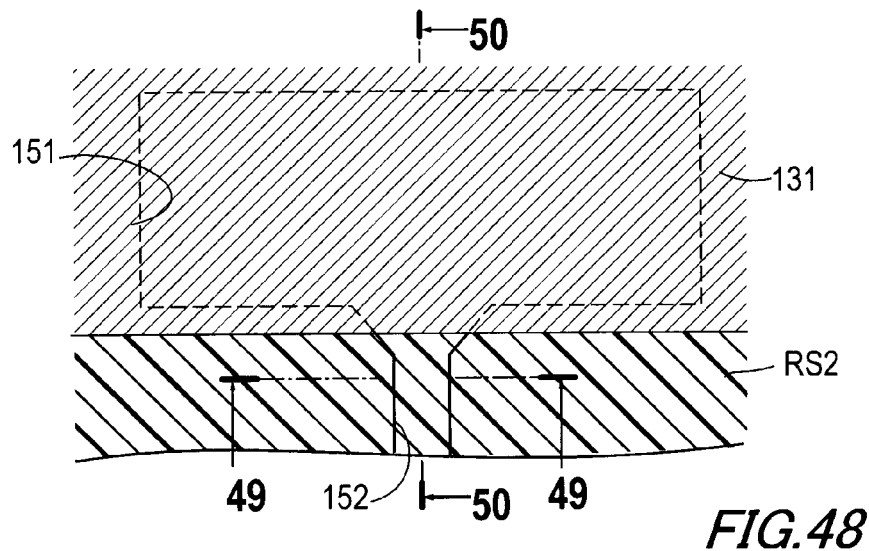
FIG. 48 is a view showing a step after the step shown in FIGS. 45 to 47.
Figure 49:
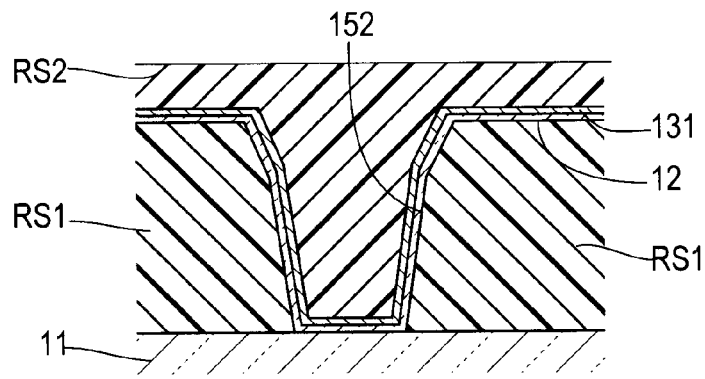
FIG. 49 is a sectional view taken along line 49-49 in FIG. 48.
Figure 50:
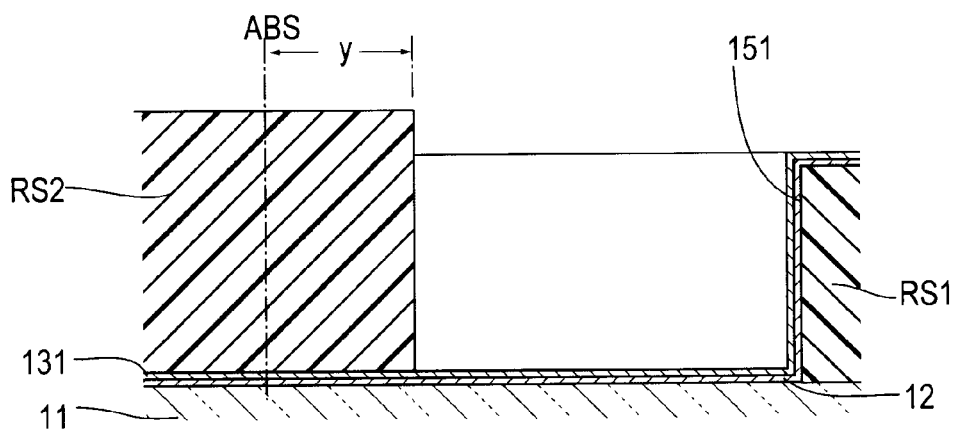
FIG. 50 is a sectional view taken along line 50-50 in FIG. 48.

Next, as shown in FIGS. 48 to 50, a resistmask RS2 is formed in the opening 152. The resistmask RS2 is formed in such a manner as to entirely cover the first electrode film 131 lying at the bottom of the opening 152 and adhered to the surface of the resist pattern RS1. One end of the resistmask RS2 facing the opening 151 is rearwardly spaced a distance y apart from an expected completed air bearing surface (ABS). In order to stabilize the composition in the vicinity of the ABS, the distance y is preferably equal to or greater than 0.2 μm.

Figure 51:
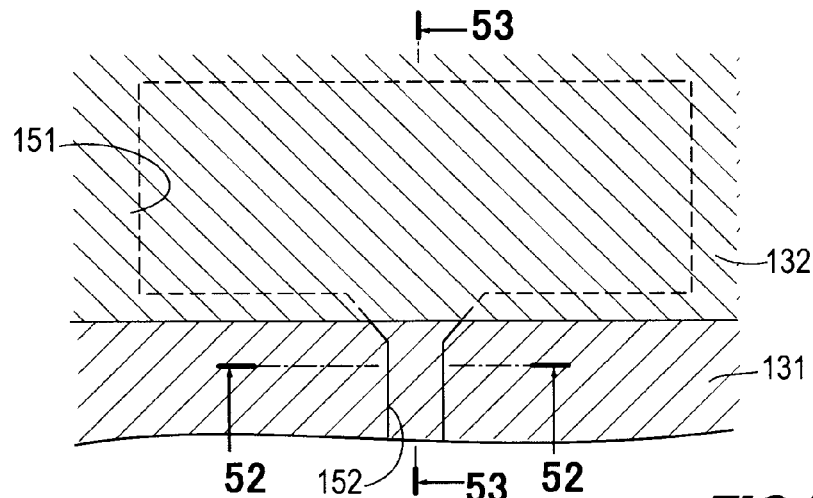
FIG. 51 is a view showing a step after the step shown in FIGS. 48 to 50.
Figure 52:
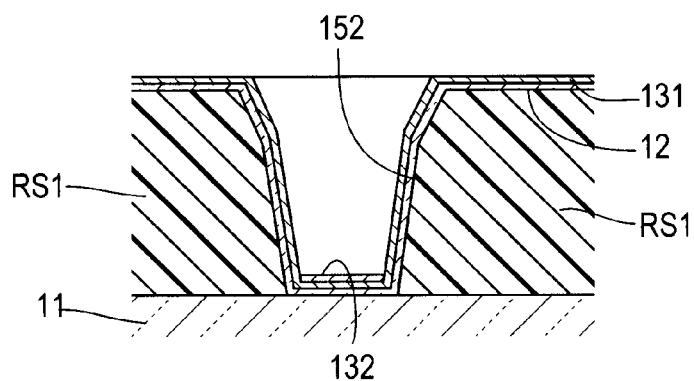
FIG. 52 is a sectional view taken along line 52-52 in FIG. 51.
Figure 53:
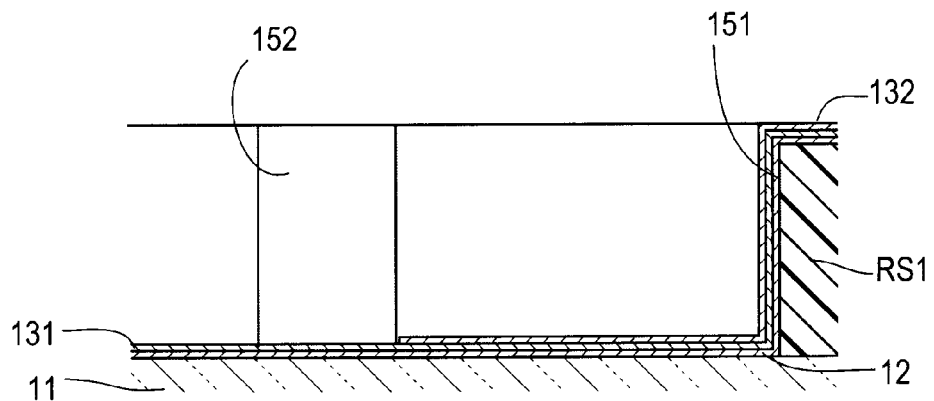
FIG. 53 is a sectional view taken along line 53-53 in FIG. 51.

Then, as shown in FIGS. 51 to 53, the second electrode film 132 is adhered to the surface of the first electrode film 131, which is exposed externally in the opening 151 or lies on the surface of the resist pattern RS1, by using sputtering, followed by a liftoff process to leave the second electrode film 132 on the bottom of the opening 151. The second electrode film 132 is formed by a magnetic film containing Fe, for example, a magnetic film such as of FeNi, FeCo or FeCoNi. Note that FIGS. 51 to 53 show a state in which the resistmask RS2 is removed from the second electrode film 132.

Figure 54:
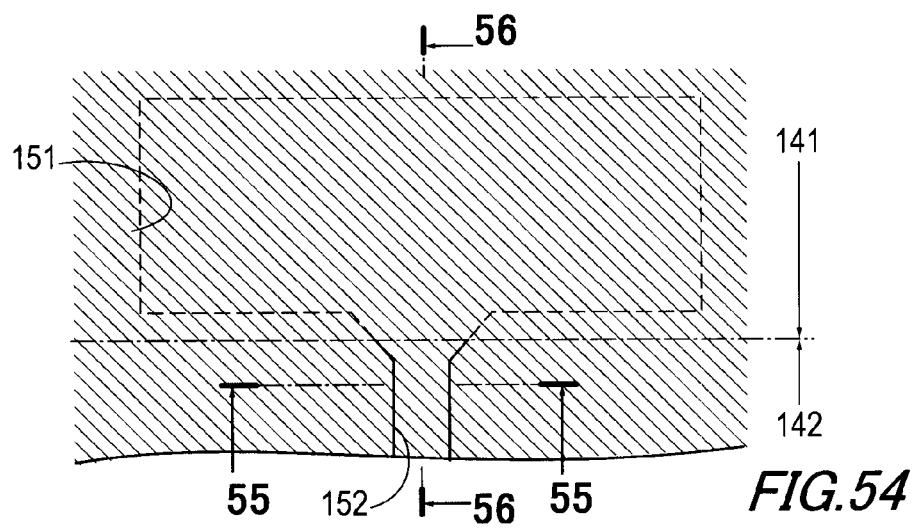
FIG. 54 is a view showing a step after the step shown in FIGS. 51 to 53.
Figure 55:
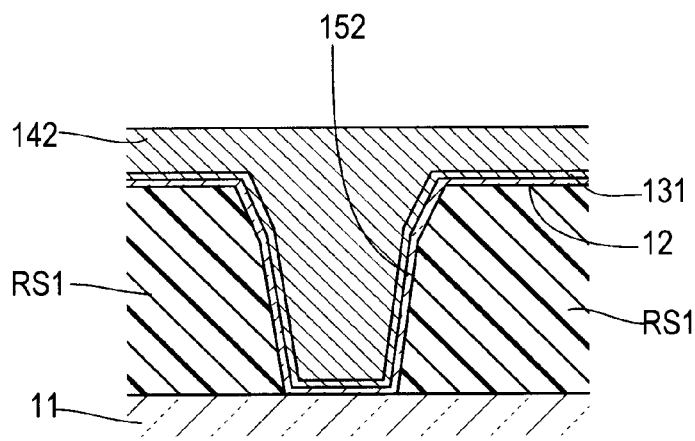
FIG. 55 is a sectional view taken along line 55-55 in FIG. 54.
Figure 56:
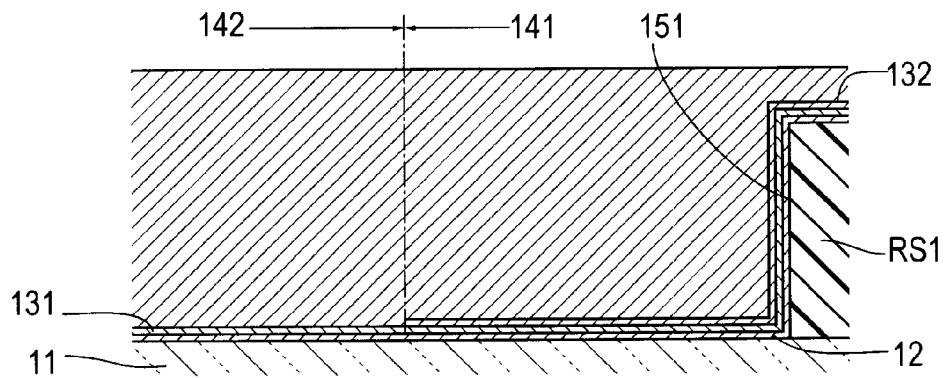
FIG. 56 is a sectional view taken along line 56-56 in FIG. 54.

Next, after removal of the resistmask RS2, as shown in FIGS. 54 to 56, plating is performed to continuously grow the plated films 141, 142 in the opening 152 where the first electrode film 131 is exposed externally. The plated films 141, 142 are also a magnetic film containing Fe, for example, a magnetic film such as of FeNi, FeCo or FeCoNi. Alternatively, the plated films 141, 142 may be formed by separate plating processes.

In the illustrated embodiment, while the plated film 141 in the opening 151 is formed on a layered structure having the first electrode film 131 containing Fe and the second electrode film 132 formed on the first electrode film 131 and containing Fe, the plated film 142 in the opening 152 is formed on the first electrode film 131. Therefore, while the film thickness T2 of the electrode film in the opening 151 is a sum of the film thickness T11 of the first electrode film 131 and the film thickness T21 of the second electrode film 132, the film thickness T1 of the electrode film in the opening 152 is equal to the film thickness T11 of the first electrode film 131, thereby satisfying T1<T2 (see FIGS. 1 to 14).

Because of the above difference between the film thicknesses T1 and T2, the Fe content in the plated film 142 of the opening 152 becomes smaller than the Fe content in the plated film 141 of the opening 151. In this case, the coercive force of the plated film 142 in the opening 152 is decreased to improve the pole erase.

From the practical viewpoint, the difference between the film thicknesses T1 and T2 is preferably set to satisfy $C2-C1 \geq 4$wt. %, where C1 (wt. %) represents a Fe content in the plated film 142 and C2 (wt. %) represents a Fe content in the plated film 141. This is the same as described above.

Figure 57:
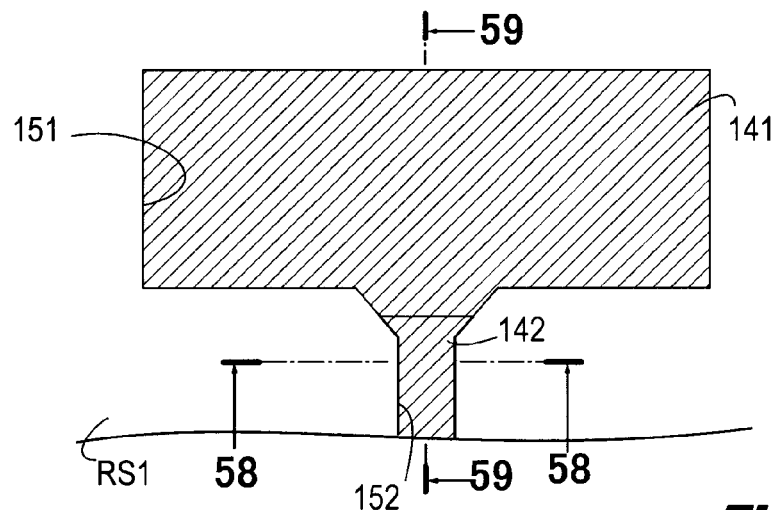
FIG. 57 is a view showing a step after the step shown in FIGS. 54 to 56.
Figure 58:
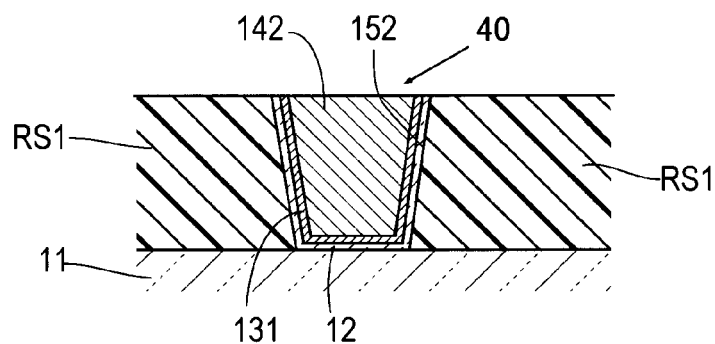
FIG. 58 is a sectional view taken along line 58-58 in FIG. 57.
Figure 59:
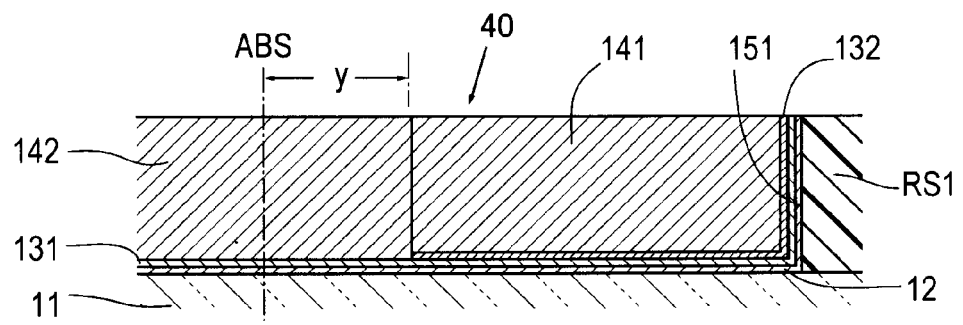
FIG. 59 is a sectional view taken along line 59-59 in FIG. 57.

Next, as shown in FIGS. 57 to 59, the second non-magnetic film 12, the first electrode film 131 and the plated films 141, 142 are selectively removed until at least the resist pattern RS1 is exposed, thereby forming the main magnetic pole film 40 as a magnetic film pattern. As the removal process, for example, a polishing method such as CMP or an etching method such as ion milling or reactive ion etching (RIE) may be adopted.

Then, after the remaining resist pattern RS1 is removed, for example, by using washing with an organic solvent or ashing, the first non-magnetic film 15 is formed, for example, by using sputtering to cover the second non-magnetic film 12 and the main magnetic pole film 40. Subsequently, the first non-magnetic film 15 is selectively removed (polished) until at least the second non-magnetic film 12 and the main magnetic pole film 40 are exposed, for example, by using CMP, thereby flattening the second non-magnetic film 12, the main magnetic pole film 40 and the first non-magnetic film 15. In the polishing process, the polishing amount should be adjusted, for example, to set the width and the height of the main magnetic pole film 40 to desired values. Then, after subjected to necessary known processes, e.g., sputtering of the overcoat film 21 such as of $Al_2O_3$ (see FIGS. 3 and 4), the air bearing surface 70 is formed at the next step, thereby forming the end face 40M of the main magnetic pole film 40 and the end face 60M of the magnetic film 60 (see FIGS. 1 to 14).

3. Head Assembly

The present invention further discloses a head assembly. The head assembly includes the foregoing magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

Figure 60:
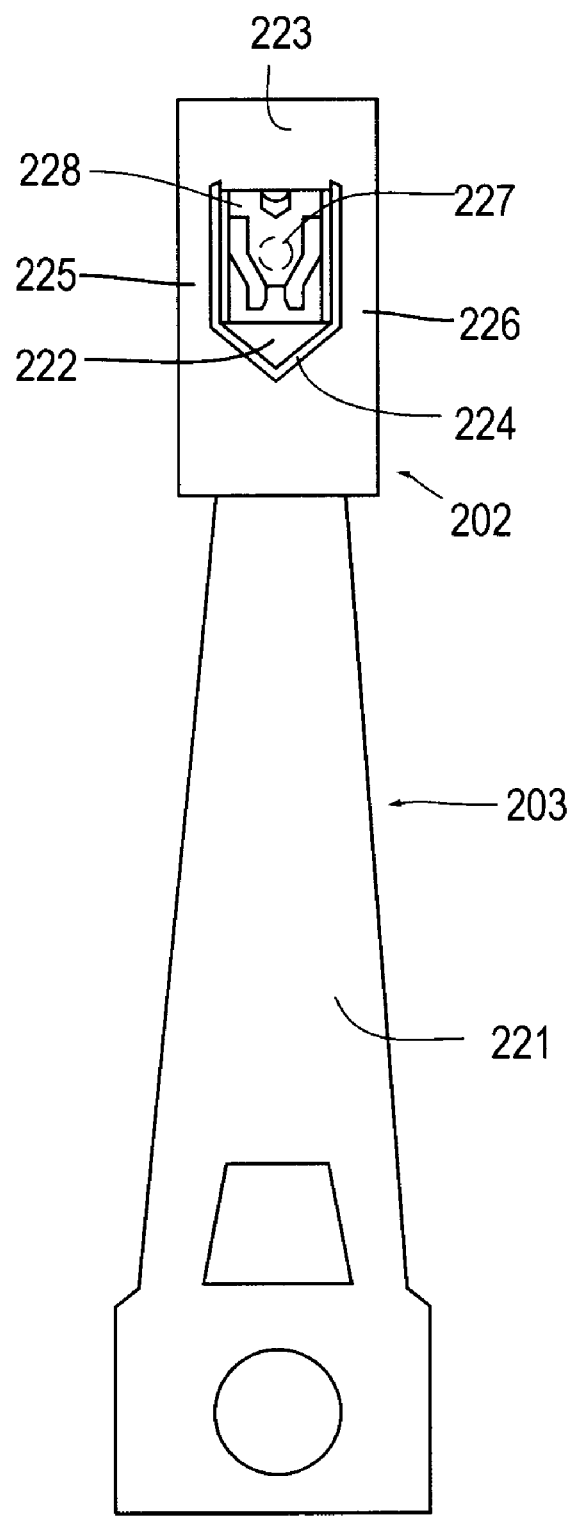
FIG. 60 is a plan view of an HGA according to the present invention.
Figure 61:
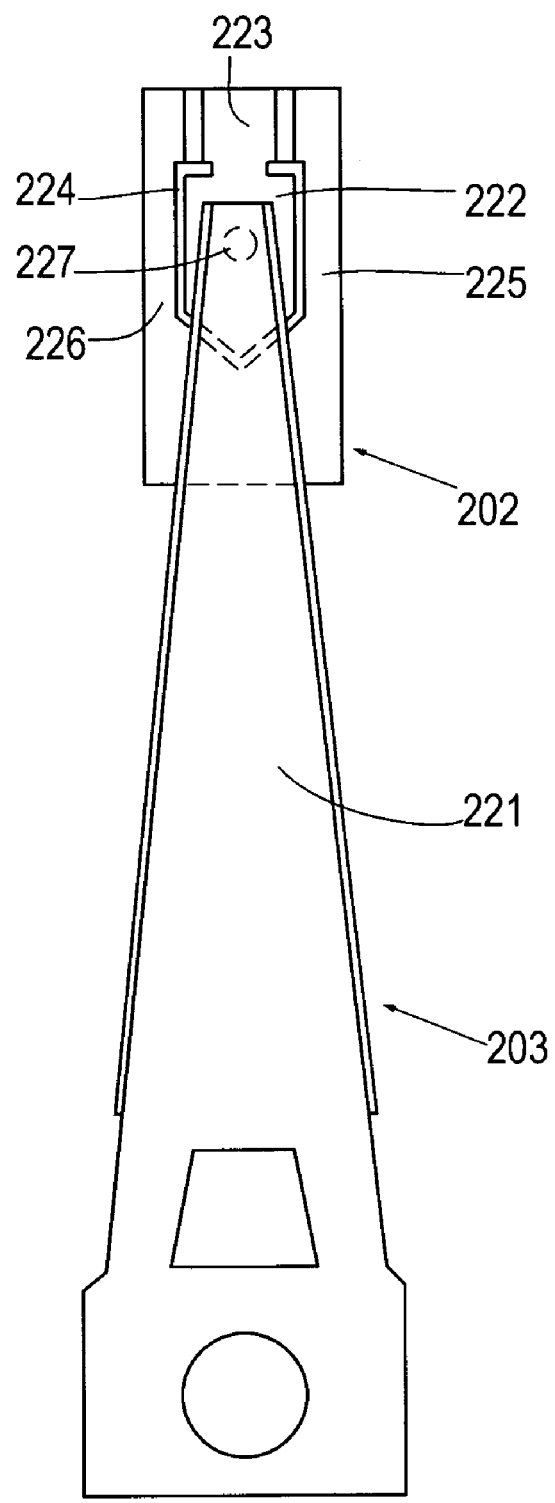
FIG. 61 is a bottom view of the HGA shown in FIG. 60.

FIG. 60 is a front view of a head assembly according to the present invention, and FIG. 61 is a bottom view of the head assembly shown in FIG. 60. The illustrated head assembly is an HGA including a suspension 203 and a magnetic head 228. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head 228 is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The magnetic head 228 is attached to one side of the tongue portion 222 through an adhesive or the like to be in spring contact with the tip of the load dimple 227.

One face of the magnetic head 228 opposite to the air bearing surface of the slider is attached to the tongue portion 222 of the suspension 203. Flexible leads and the like not shown in the drawings are connected to the magnetic head 228.

Figure 62:
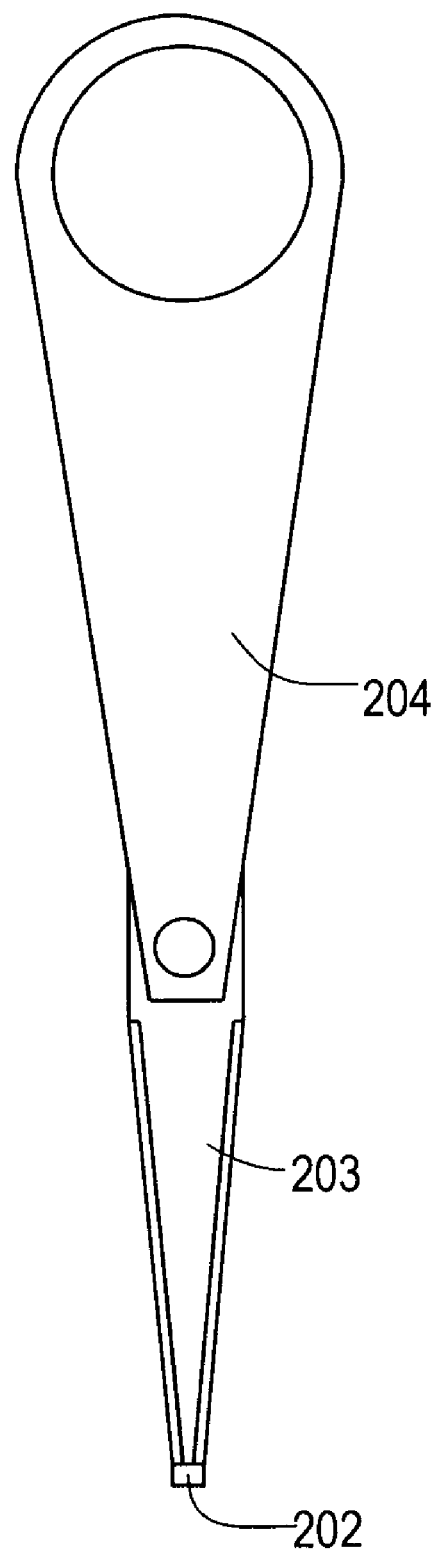
FIG. 62 is a plan view of an HAA according to the present invention.

FIG. 62 is a front view of an HAA. The illustrated HAA includes the suspension 203, the magnetic head 228 and an arm 204. The arm 204 is integrally formed of a suitable non-magnetic metallic material such as an aluminium alloy. The arm 204 is provided with a mounting hole. The mounting hole is used for mounting on a positioning device provided in a magnetic disk apparatus. One end of the suspension 203 is secured to the arm 204, for example, with a ball connecting structure.

4. Magnetic Recording/Reproducing Apparatus

Figure 63:
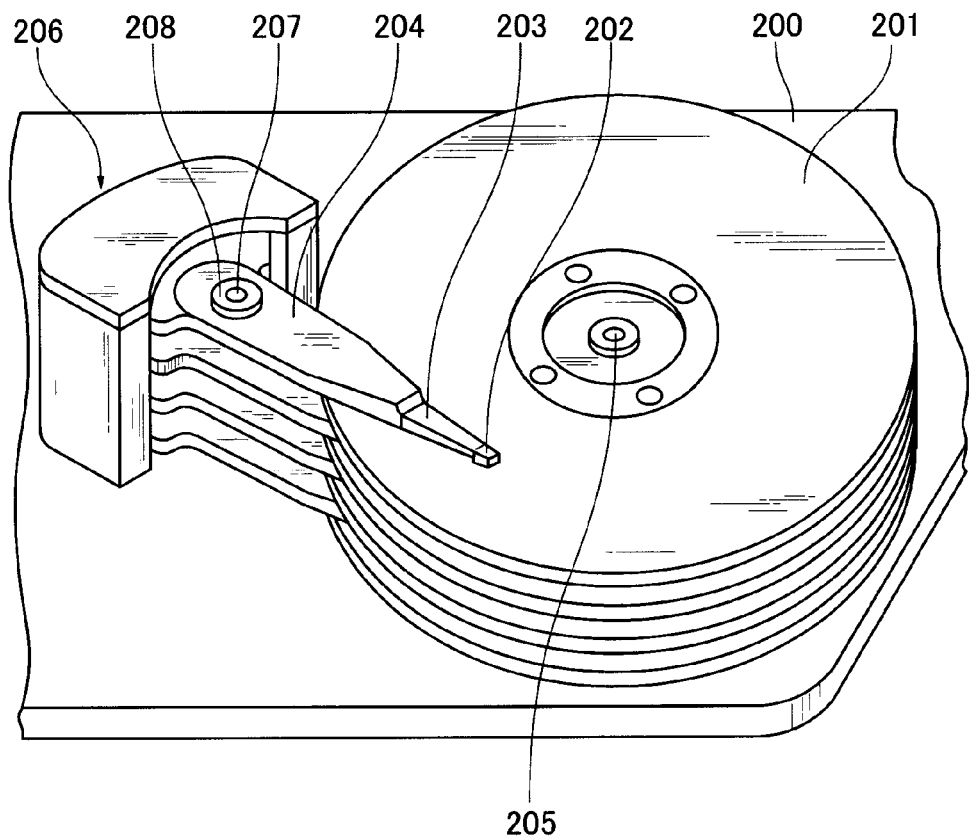
FIG. 63 is a perspective view of a magnetic recording apparatus according to the present invention.

Next will be described a structure of a magnetic recording apparatus mounted with the magnetic head according to the present invention. FIG. 63 shows the structure of the magnetic recording apparatus. The magnetic recording apparatus, which is mounted with the foregoing magnetic head, is, for example, a hard disk drive.

As shown in FIG. 63, for example, the magnetic recording apparatus includes, within a case 200, a plurality of magnetic disks (e.g., hard disks) 201 corresponding to the magnetic recording medium 80 for magnetically recording information, a plurality of suspensions 203 disposed corresponding to the respective magnetic disks 201 and supporting the magnetic heads at their one ends, and a plurality of arms 204 supporting the other ends of the suspensions 203. The magnetic disks 201 are rotatable about a spindle motor 205 which is fixed to the case 200. The arms 204 are connected to an actuator 206 which functions as a power source and are pivotable through a bearing 208 about a fixed shaft 207 which is fixed to the case 200.

The actuator 206 is constructed to include, for example, a driving source such as a voice coil motor. For example, the magnetic recording apparatus is a model where the plurality of arms 204 are pivotable about the fixed shaft 207 in an integrated manner. In FIG. 63, the case 200 is shown partially cut-out to make it easy to see the internal structure of the magnetic recording apparatus.

The magnetic head 228 is a magnetic head according to the present invention. When the magnetic disk 201 rotates for recording or reproducing information, an air flow generated between the recording surface (or magnetic head-facing surface) of the magnetic disk 201 and the air bearing surface 220 is utilized to let the magnetic head take off from the recording surface of the magnetic disk 201.

Figure 64:
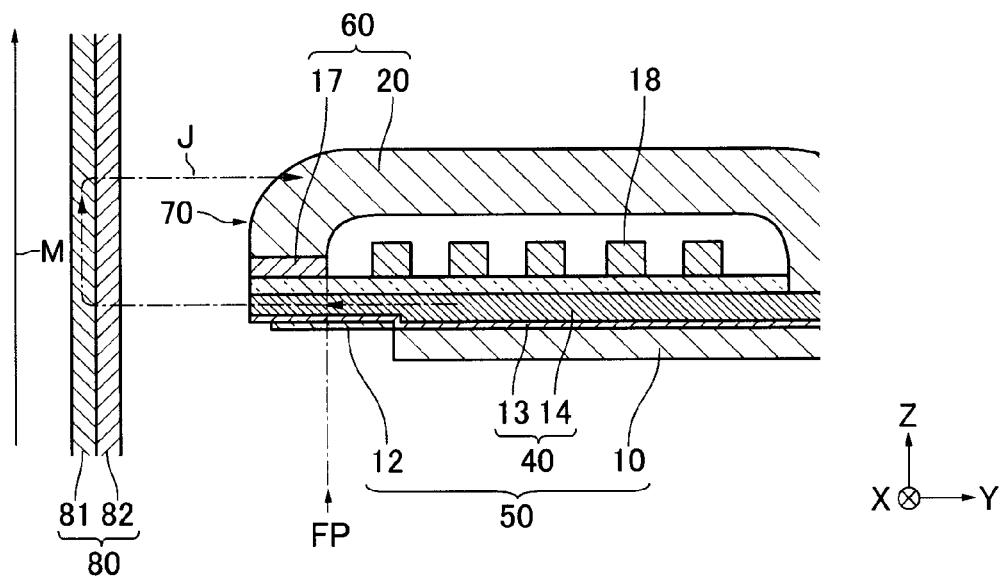
FIG. 64 is a view illustrating recording operation of the magnetic recording/reproducing apparatus shown in FIG. 63.

As shown in FIG. 64, the magnetic recording medium 80 includes, for example, a magnetization film 81 and a soft magnetic film 82 disposed close to and remote from the magnetic head, respectively. The magnetization film 81 functions to magnetically record information, while the soft magnetic film 82 functions as a path of a magnetic flux (so-called flux path) in the magnetic recording medium 80. The magnetic recording medium 80 of this type is generally called "double layer recording medium" for perpendicular recording. Needless-to-say, the magnetic recording medium 80 may include another layer, for example, in addition to the above magnetization film 81 and soft magnetic film 82.

The upwardly directed arrow shown in FIG. 64 indicates the moving direction M along which the magnetic recording medium 80 relatively moves with respect to the magnetic head. Assuming that the movement of the magnetic recording medium 80 moving in the moving direction M is a kind of flow, the foregoing "trailing side" refers to a flow-out side (or front side in the moving direction M), and particularly in this case, refers to an upper side in the thickness direction (Z-axis direction). On the other hand, a flow-in side (or rear side in the moving direction M) is referred to as "leading side", and particularly in this case, corresponds to a lower side in the thickness direction. The upper end edge E1, which is a recording portion of the main magnetic pole film 40, is called "trailing edge TE", and its width W1 is called "trailing edge width".

Recording and reproducing operations to be performed by the above magnetic recording/reproducing apparatus will be described with reference to FIG. 28. When recording information, specifically, a recording magnetic flux J is generated as a current flows from an external circuit not shown in the drawings to the coil film 18 of the recording head portion 100B. After absorbed in the auxiliary magnetic pole film 10 and the main magnetic pole film 40 of the magnetic pole film 50, the magnetic flux J flows toward the small width portion 40A. At this time, since the magnetic flux J is focused because of narrowing at the flare point FP, it is finally concentrated in the vicinity of the trailing edge TE. When the magnetic flux J concentrated in the vicinity of the trailing edge TE is emitted to generate a perpendicular magnetic field, the magnetization film 81 is magnetized by the perpendicular magnetic field, thereby magnetically recording information on the magnetic recording medium 80.

In this case, the gradient of the perpendicular magnetic field increases because the spreading component of the magnetic flux J is absorbed in the write shield film 17. The magnetic flux J absorbed in the write shield film 17 is resupplied to the magnetic pole film 50 through the return yoke film 20.

After magnetization of the magnetization film 81, the magnetic flux J emitted from the magnetic pole film 50 toward the magnetic recording medium 80 is absorbed in the return yoke film 20 through the soft magnetic film 82. At this time, a part of the magnetic flux J is also absorbed in the write shield film 17. The magnetic flux J absorbed in the write shield film 17 and the return yoke film 20 is also resupplied to the magnetic pole film 50. This enables circulation of the magnetic flux J between the recording head portion 100B and the magnetic recording medium 80.

Here, since the magnetic head according to the present invention can achieve both the improvement in overwrite characteristic by increasing the saturation magnetic flux density and the improvement in pole erase by decreasing the coercive force, there can be obtained a magnetic recording/reproducing apparatus in which the pole erase is improved and at the same time, sufficient overwrite characteristic (COW) can be assured with respect to the magnetic recording medium 80 that has a high coercive force for improvement in recording capacity.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising:
a slider and a perpendicular recording element,
wherein said perpendicular recording element includes a main magnetic pole film and is supported by said slider,
said main magnetic pole film is a plated film formed on an electrode film and having a small width portion and a large width portion,
said small width portion is a portion for emitting a perpendicular magnetic field from a front end thereof,
said large width portion is a portion being continuous with a rear end of said small width portion and having an increased width, and
said electrode film is different in film thickness between beneath a portion of said plated film forming at least said front end of said small width portion and beneath a portion of said plated film forming said large width portion.

2. The magnetic head of claim 1, wherein said plated film has a higher saturation magnetic flux density in said small width portion than in said large width portion.

3. The magnetic head of claim 2, wherein said electrode film satisfies $T1 > T2$, where T1 represents a film thickness at said front end of said small width portion and T2 represents a film thickness in said large width portion.

4. The magnetic head of claim 3, wherein said electrode film includes a first electrode film containing Fe and a second electrode film formed on said first electrode film and containing Fe,
said film thickness T1 is a sum of a film thickness T11 of said first electrode film and a film thickness T21 of said second electrode film, and
said film thickness T2 is equal to said film thickness T11 of said first electrode film.

5. The magnetic head of claim 3, wherein said main magnetic pole film contains at least one element of Fe, Co and Ni and has a larger Fe content at said front end of said small width portion than in said large width portion.

6. The magnetic head of claim 5, wherein said main magnetic pole film satisfies $C1 - C2 \geq 4$ wt. %, where C1 (wt. %) represents a Fe content in said small width portion and C2 (wt. %) represents a Fe content in said large width portion.

7. The magnetic head of claim 1, wherein said plated film has a lower coercive force in said small width portion than in said large width portion.

8. The magnetic head of claim 7, wherein said electrode film satisfies $T1 < T2$, where T1 represents a film thickness at said front end of said small width portion and T2 represents a film thickness in said large width portion.

9. The magnetic head of claim 8, wherein said electrode film includes a first electrode film containing Fe and a second electrode film formed on said first electrode film and containing Fe,
said film thickness T1 is equal to a film thickness T11 of said first electrode film, and
said film thickness T2 is a sum of said film thickness T11 of said first electrode film and a film thickness T21 of said second electrode film.

10. The magnetic head of claim 8, wherein said main magnetic pole film contains at least one element of Fe, Co and Ni and has a smaller Fe content in said small width portion than in said large width portion.

11. The magnetic head of claim 10, wherein said main magnetic pole film satisfies $C2 - C1 \geq 4$ wt. %, where C1 (wt. %) represents a Fe content in said small width portion and C2 (wt. %) represents a Fe content in said large width portion.

12. The magnetic head of claim 1, which further includes a reproducing element.

13. A head assembly comprising:
a magnetic head and a head support device,
wherein said magnetic head includes a slider and a perpendicular recording element,
said perpendicular recording element includes a main magnetic pole film and is supported by said slider,
said main magnetic pole film is a plated film formed on an electrode film and having a small width portion and a large width portion,
said small width portion is a portion for emitting a perpendicular magnetic field from a front end thereof,
said large width portion is a portion being continuous with a rear end of said small width portion and having an increased width,
said electrode film is different in film thickness between beneath a portion of said plated film forming at least said front end of said small width portion and beneath a portion of said plated film forming said large width portion, and
said head support device supports said magnetic head in such a manner as to permit rolling and pitching of said magnetic head.

14. The head assembly of claim 13, wherein said plated film of said magnetic head has a higher saturation magnetic flux density in said small width portion than in said large width portion.

15. The head assembly of claim 14, wherein said electrode film of said magnetic head satisfies $T1 > T2$, where T1 represents a film thickness at said front end of said small width portion and T2 represents a film thickness in said large width portion.

16. The head assembly of claim 13, wherein said plated film of said magnetic head has a lower coercive force in said small width portion than in said large width portion.

17. The head assembly of claim 16, wherein said electrode film of said magnetic head satisfies $T1<T2$, where T1 represents a film thickness at said front end of said small width portion and T2 represents a film thickness in said large width portion.

18. The head assembly of claim 13, wherein said magnetic head further includes a reproducing element.

19. A magnetic recording/reproducing apparatus comprising:
a head assembly and a magnetic recording medium,
wherein said head assembly includes a magnetic head and a head support device,
said magnetic head includes a slider and a perpendicular recording element,
said perpendicular recording element includes a main magnetic pole film and is supported by said slider,
said main magnetic pole film is a plated film formed on an electrode film and having a small width portion and a large width portion,
said small width portion is a portion for emitting a perpendicular magnetic field from a front end thereof,
said large width portion is a portion being continuous with a rear end of said small width portion and having an increased width,
said electrode film is different in film thickness between beneath a portion of said plated film forming at least said front end of said small width portion and beneath a portion of said plated film forming said large width portion,
said head support device supports said magnetic head in such a manner as to permit rolling and pitching of said magnetic head, and
said head assembly cooperates with said magnetic recording medium to record magnetic data on said magnetic recording medium.

20. The magnetic recording/reproducing apparatus of claim 19, wherein said plated film of said magnetic head has a higher saturation magnetic flux density in said small width portion than in said large width portion.

21. The magnetic recording/reproducing apparatus of claim 20, wherein said electrode film of said magnetic head satisfies $T1>T2$, where T1 represents a film thickness at said front end of said small width portion and T2 represents a film thickness in said large width portion.

22. The magnetic recording/reproducing apparatus of claim 19, wherein said plated film of said magnetic head has a lower coercive force in said small width portion than in said large width portion.

23. The magnetic recording/reproducing apparatus of claim 22, wherein said electrode film of said magnetic head satisfies $T1<T2$, where T1 represents a film thickness at said front end of said small width portion and T2 represents a film thickness in said large width portion.

24. The magnetic recording/reproducing apparatus of claim 19, wherein said magnetic head further includes a reproducing element.

* * * * *